United States Patent
Fikis et al.

Patent Number: 5,953,404
Date of Patent: Sep. 14, 1999

[54] METHOD AND SYSTEM FOR PROVIDING MEDIATED ACCESS BETWEEN SIGNALING NETWORKS

[75] Inventors: Gerald W. Fikis, Nepean; H. Stewart Patch, Orleans, both of Canada; Michael J. Muelifr, Raleigh, N.C.; Venkat Ravishankar, Apex, N.C.; Dean D. Glenn, Cary, N.C.; Virgil E. Long, Raleigh, N.C.; Lee B. Smith, Apex, N.C.

[73] Assignee: Stentor Resource Centre, Inc., Ontario, Canada

[21] Appl. No.: 08/833,986

[22] Filed: Apr. 11, 1997

[51] Int. Cl.⁶ ........................................... H04M 7/00
[52] U.S. Cl. ........................................ 379/230; 379/220
[58] Field of Search ................... 395/200.76, 200.79; 370/428; 379/201, 207, 220, 221, 229, 230

[56] References Cited

U.S. PATENT DOCUMENTS

| | | | |
|---|---|---|---|
| 5,430,719 | 7/1995 | Weisser, Jr. | 370/420 |
| 5,550,914 | 8/1996 | Clarke et al. | 379/230 |
| 5,566,235 | 10/1996 | Hetz | 379/201 |
| 5,574,782 | 11/1996 | Baird et al. | 379/220 |
| 5,664,102 | 9/1997 | Faynberg | 379/207 |
| 5,680,552 | 10/1997 | Netravali et al. | 379/220 |
| 5,701,301 | 12/1997 | Weisser, Jr. | 370/428 |

OTHER PUBLICATIONS

TEKELEC, EAGLE™ STP, INMAP: Intelligent Network Mediation Access Point Feature; Nov. 1995, two pages; Publication 908–0136–01.

*Primary Examiner*—Daniel S. Hunter
*Attorney, Agent, or Firm*—Cobrin & Gittes

[57] ABSTRACT

A method and system is disclosed for mediating signalling protocol dialogue between an internal signalling network operational domain operated by one network operator and an external signalling network operational domain operated by another network operator. One embodiment provides a method of dividing the SS7 traffic (Message Signal Units or MSUs) arriving for Mediation, into classes such that network performance requirements can be met, wherein some message classes will receive only normal SS7 processing while others will be analyzed in detail. MSUs requiring detailed analysis must be routed to a mediation application process appropriate to that class. Another embodiment provides a method of manipulating Signalling Connection Control Part (SCCP) address parameters in the SMP in order to maintain normal SS7 message processing and routing functions while mediating individual messages. Yet another embodiment provides a method enabling the SMP to route a received MSU on toward its intended final destination based on information encoded in the Message Transfer Part (MTP) addresses contained in the MSU.

16 Claims, 32 Drawing Sheets

Sheet 1

Sheet 2

Sheet 3

Sheet 4

Sheet 5

Sheet 6

Sheet 1

Sheet 2

Sheet 3

Sheet 4

Sheet 5

Sheet 6

Sheet 7

Sheet 8

Sheet 9

Sheet 10

Sheet 11

Sheet 12

METHOD AND SYSTEM FOR PROVIDING MEDIATED ACCESS BETWEEN SIGNALING NETWORKS

FIELD OF THE INVENTION

This invention relates to switched telephone networks, but more particularly, to a method and system for mediating signalling protocol dialogue between an internal signalling network operational domain operated by one network operator and an external signalling network operational domain operated by another network operator. The network operators may be providing either bilaterally complementary or competing telecommunications services, capabilities or both, or may operate as an intermediate agent for a third party network.

BACKGROUND OF THE INVENTION

The need for the present invention results from expectations within the telecommunications industry that, either voluntarily or by regulatory fiat, a more liberalized interconnection environment for telecommunications signalling will be introduced. Liberalized interconnection can also be characterized as an "open access" environment. In view of this, care must be taken by the operator of a signalling network to protect the vital telecommunications functions dependent upon and enabled by that network, from any impairment resulting from this liberalized interconnection.

The concepts of the present invention may apply to a variety of out-of-band signalling networks. The preferred embodiment however, relates to a Signalling System Number 7 (equivalently known as either "SS7" or "Common Channel Signalling (Number) 7" (CCS7)) compliant signalling system commonly used in a public switched telephone networks.

A signalling network is a critical resource enabling the delivery of telecommunications services to end users by its operator. The operator must protect its own network (equivalently identified within the present invention as the internal (operational) domain) from impairment due directly or indirectly to interconnection with other (external) signalling networks. In particular, all messages received from an external operational domain must be validated to ensure that they conform to any applicable agreements governing the communications to be exchanged between the internal and external domains.

The process of examining and validating the signalling traffic crossing the interface between the internal network and an external network is called "mediation". Mediation is, therefore, a set of procedures and capabilities that act together to maintain both service; network, and physical element integrity, in the face of external influences. In effect, mediation is technological insurance against threats which are perceived to exist from outside the internal signalling network.

Mediation can be carried out in any signalling point (SP) in the internal network either as a part of, or the entire function of, that SP. A Signalling Mediation Point (SMP) is an SS7 Signalling Point deployed within a signalling network whose entire function is "mediation". The mediation function is invoked whenever there is a need for communication between an internal domain's Signalling Point and an external domain's Signalling Point. Thus, Mediated Access provides access to the internal SS7 network domain while preserving its integrity and security, including verification (adherence) to those capabilities defined in either a contractual obligation, mutual business agreement or regulatory directive/tariffed structure.

An attempt to provide mediation of an open AIN interface is offered in U.S. Pat. No. 5,430,719, of Weisser, Jr. In this patent, a table carrying the unique transaction identifiers with service process identifiers generated by various service provider applications is created. Mediation rules include testing the table to determine whether the Directory Number referenced in a message request from a service provider application is a customer of the service provider, whether trunk group routing requests are valid for the service providers and whether any access to, or particular levels of access to, certain network elements are authorized for the service provider requesting the service.

The teachings of Weisser are limited to mediating access to the internal domain via SCPs located within the domain and specifically in an AIN environment and not to the mediation of all signalling traffic entering or leaving the internal domain as a direct result of interconnection.

The problem which has been encountered to date with the development of the Signalling Mediation Point (SMP) is that sufficiently general methods and rules have not been provided so that mediated access can be applicable across a wide range of interconnection complexity ranging from a simple connection to a single external Signalling Point up to interconnections with external networks of arbitrary size and complexity.

Another problem with existing SMP development is that designs are often limited to a specific subset, Application Part or 'user part' of the SS7 protocol architecture.

A need therefore exists for providing a method for developing signalling network mediation which overcomes the shortcomings of the prior art.

SUMMARY OF THE INVENTION

It is, therefore, an object of the present invention to provide a method of incorporating Mediation into an existing signalling architecture in such a way as to "mediate" traffic at the boundary between a protected (that is, "internal") network and a "foreign" (or "external") network or Signalling Point, in order to exercise due prudence while implementing such interconnections.

Another object of the present invention is to provide a Network Element dedicated to providing a mediation function in the form of a Signalling Mediation Point (SMP).

Another object of the present invention is to provide a method of mediating traffic to ensure that all signalling traffic between interconnecting SS7 networks is directed to an SMP for mediation.

Another object of the present invention is to provide an internal SMP architecture which is highly flexible so that the SMP can quickly adapt to new, potential or observed threats to the network that it protects.

Another object of the present invention is to provide a method of dividing the SS7 traffic (Message Signal Units or MSUs) arriving for Mediation, into classes such that network performance requirements can be met, wherein some message classes will receive only normal SS7 processing while others will be analyzed in detail. MSUs requiring detailed analysis must be routed to a mediation application process appropriate to that class.

Yet another object of the present invention is to provide either:

(i) a method of manipulating Signalling Connection Control Part (SCCP) address parameters in the SMP in order to maintain normal SS7 message processing and routing functions while mediating individual messages, or (ii) a method enabling the SMP to route a received MSU on toward its intended final destination based on information encoded in the Message Transfer Part (MTP) addresses contained in the MSU.

Yet another object of the present invention is to provide a method of tracking in real time, signalling protocol associations between Signalling Points.

These objects, advantages and novel features of the invention will be set forth in part in the description which follows and in part, will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

In order to impart full understanding of the manner in which this object and others are attained in accordance with the present invention, preferred embodiments thereof will be described hereinafter with reference to the accompanying drawings wherein.

In the following description and the drawings, the same reference numerals will refer to the same structural elements.

ACRONYMS

Figure 1:
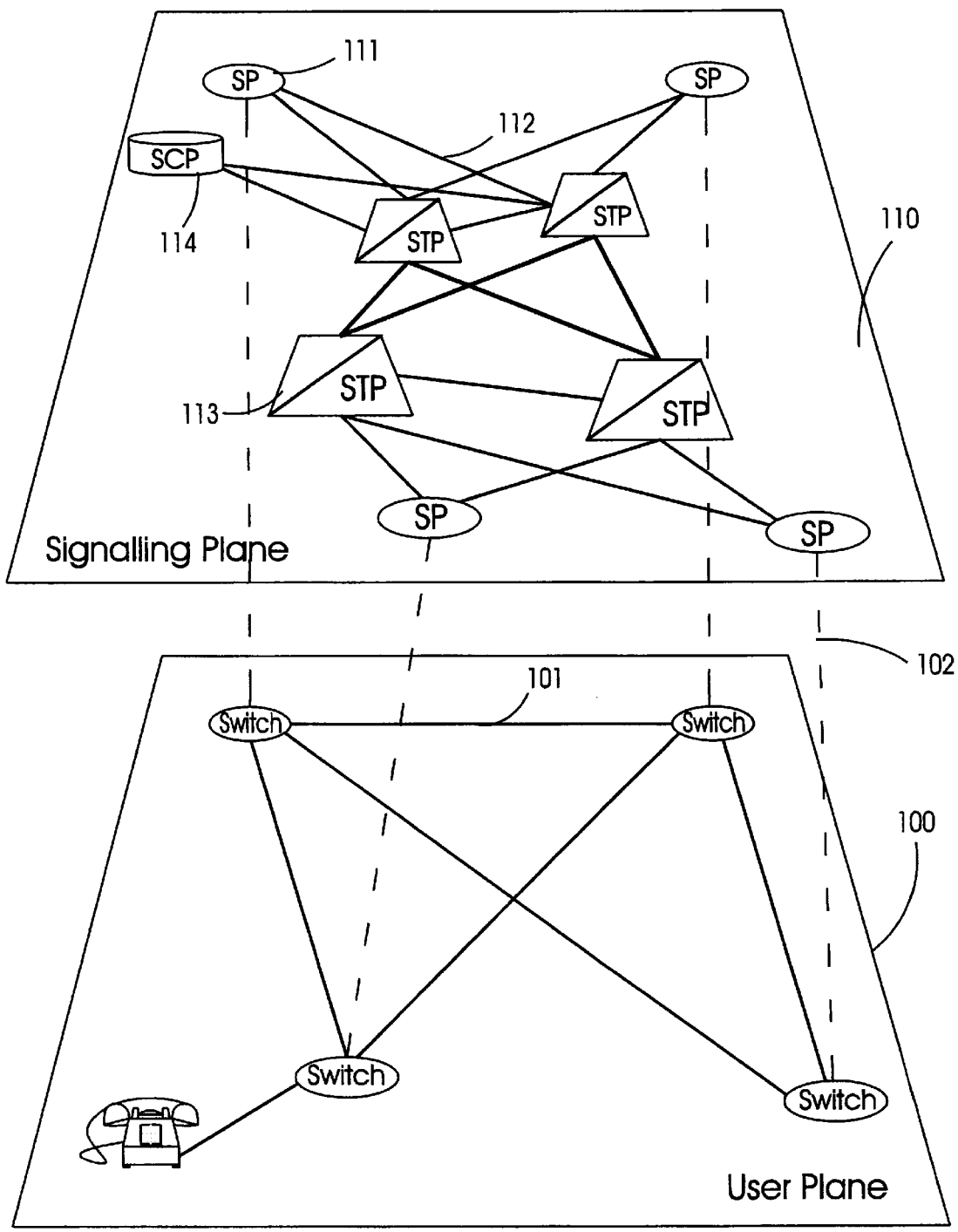
FIG. 1 is a diagram illustrating a typical Signalling System Number 7 (SS7) network and its relation to the physical network it controls.

In order to lighten the following description, the following acronyms will be used:

ACF: Association Control Function
AIN: Advanced Intelligent Network (conceptualized by Bell Communications Research Inc., equivalently known as "Bellcore")
ASE: Application Service Element
ASN.1: Abstract Syntax Notation Number 1
CCS7: Common Channel Signalling (System) 7 (also equivalently known as "SS7")
CIC: Circuit Identification Code (an SS7 ISUP parameter)
CL: Connectionless
CdPA: Called Party Address (an SS7 SCCP parameter)
CgPA. Calling Party Address (an SS7 SCCP parameter)
CO: Connection Oriented
CSL: Component Sub-Layer
DP: Destination Point
DPC: Destination Point Code (an SS7 MTP parameter)
GTT: Global Title Translation
HMDT: (Signalling Message) Handling (MTP) Message Distribution
HVIB: (Signalling Message) Handling for VSP In-Bound (MTP messages)
HVOB: (Signalling Message) Handling for VSP Out-Bound (MTP messages)
IAM: Initial Address Message (an SS7 ISUP message)
ID: Identification
IN: Intelligent Network
ISUP: Integrated Services (Digital Network) User Part (an SS7 protocol part) (also equivalently known as ISDN User Part)
MSU: Message Signal Unit
MTP: Message Transfer Part (an SS7 protocol part)
NE: Network Element
OPC: Originating Point Code (an SS7 MTP parameter)
OSI: Open Systems Interconnection
REL: Release Message (an SS7 ISUP message)
RLC: Release Complete (an SS7 ISUP message)
SCP: Service Control Point
SCCP: Signalling Connection Control Part (an SS7 protocol part)
SDL: Specification and Description Language (developed by ITU-T (formerly CCITT))
SEP: Signalling End Point
SIO: Service Information Octet (an SS7 MTP parameter)
SMP: Signalling Mediation Point
SP: Signalling Point
SSN: Sub-System Number (part of an SCCP address)
SSP: Service Switching Point
SS7. Signalling System (Number) 7 (also equivalently known as "CCS7")
STP: Signalling Transfer Point
TC: Transaction Capabilities
TCAP: Transaction Capabilities Application Part (an SS7 protocol part)
TM: Transaction Monitor
TSM: Transaction State Machine
UDT: Unit Data (an SS7 SCCP message)
UDTS: Unit Data Status (an SS7 SCCP message)

VSP: Virtual Signalling Point
XUDT: Extended Unit Data (an SS7 SCCP message)
XUDTS: Extended Unit Data Status (an SS7 SCCP message)

Note that, AIN is considered an implementable subset of the international standards developed by the ITU-T, therein identified as "IN". However, for the purpose of the present invention, IN will be used hereinafter, and solutions should be treated as equivalently applicable to AIN.

Cartesian Mapping

To lighten the description of some methods of the invention, the term "map" has been used. To those skilled in the art, the term map implies a collection, $\mathcal{M}$ of data with the following properties. $\mathcal{M}$ is a subset of $K \otimes V$, the Cartesian product of arbitrary sets K and V representing keys and values respectively. $\mathcal{M}$ contains no more than one element, (k, v), having the particular key value k. Thus k is a unique identifier for the element (k, v). The element (k, v) is sometimes represented using the notation $k \rightarrow v$.

DESCRIPTION OF PRIOR ART

Description of the SS7 Protocols

The SS7 protocol is divided into several individual parts that interact in order to deliver the overall SS7 functionality. These parts include, but are not limited to the Message Transfer Part (or MTP), the Integrated Services (Digital Network) User Part (ISUP), the Signalling Connection Control Part (SCCP), and the Transaction Capabilities Application Part (TCAP).

The Message Transfer Part (MTP) performs the basic SS7 service of carrying signalling data between source and destination Signalling Points using procedures and parameters whose purpose and format are defined in American National Standard T1.111. A Signalling Point that can receive signalling data (a Message Signal Unit or "MSU") addressed to another Signalling Point and relay the MSU on toward its destination is classified as a Signalling Transfer Point (STP). Signalling Points without this capability are Signalling End Points (SEP).

Every Signalling Point in an SS7 network is addressed by a signalling "point code". In some cases multiple signalling point codes may be used to address a single Signalling Point. When the MTP at a Signalling Point receives a message addressed to one of its signalling point codes, it passes it to one of the SS7 protocol parts that use the MTP. Similarly, the MTP accepts messages from its user protocol parts and routes them toward their destination SP via the links connecting the current SP to the network. This message routing to and from MTP users is shown in the block diagram of FIG. 4. Those skilled in the art will recognize that many technologies may be used to support these signalling links such as broadband, Asynchronous Transfer Mode (ATM) and wireless.

When the MTP at a Signalling End Point receives a message addressed to another SEP it discards the message. In this situation, the implementation also either generates maintenance logs or initiates tests to allow maintenance personnel to diagnose the reason why the offending message was improperly routed to this Signalling Point.

When the MTP at a STP receives a message addressed to another Signalling Point, it consults routing tables to determine the outgoing link that it should use to route the message either directly to or on towards its final destination. These routing tables are established by provisioning procedures and their on-going status is maintained by MTP management messages that inform the Signalling Transfer Point of the current status of remote Signalling Points and the routes toward them.

Gateway screening is an optional STP capability. When interconnections are established with another (external) network, Gateway Screening may be deployed by the internal network in order to scan messages received from the other network to ensure that they fall within classes of messages that the networks have agreed to exchange. Gateway Screening has no effect on messages outgoing to another network. It's normally viewed as the responsibility of each receiving network to screen its own incoming messages. Messages passed by Gateway Screening receive normal MTP routing. A gateway STP discards (and may generate maintenance logs for) messages that fail to pass gateway screening checks.

Gateway Screening operates on a very limited number of fields in the low level SS7 protocol parts: MTP and SCCP. Particularly, MTP gateway screening operates on the Originating Point Code (OPC) (where the message comes from), Destination Point Code (DPC) (where it is going to) and the Service Information Octet (SIO), which identifies the SS7 protocol part particular to this message. SCCP gateway screening is concerned with only allowing messages with predetermined GTTs, CgPAs and CdPAs to enter the internal network.

The MTP defines the fundamental structure of an MSU, consisting of label and content portions. The signalling label identifies (by signalling point codes) the originating and destination SP's for the MSU. The label also contains the Service Information Octet which identifies the protocol part sending and receiving the message. This will be used by the MTP at the destination SP to deliver the message to the appropriate protocol function within the SP. The content portion of the MSU is transferred transparently by the MTP and interpreted by the recipient protocol part at the destination SP.

The basic function of the Integrated Services Digital Network (ISDN) User Part (ISUP) is to control the interoffice trunks of interconnected Central Offices (switches). Its services include basic call control and services that supplement the basic call.

ISUP provides a basic set of messages which include the Initial Address Message (IAM), Address Complete Message (ACM), and Answer Message (ANM), for basic call set up. Two messages, the Release (REL) and Release Complete (RLC) are provided for the call "tear down" process. Each of these messages contains a specified set of mandatory parameters that are required for basic call control. In addition, messages may contain any of a large set of optional parameters which are used to convey supplementary information.

Beyond the messages and parameters needed for basic call control, ISUP also provides for the support of supplementary services (to convey supplementary service information without affecting the basic call state) as well as network management, (e.g. to temporarily block/unblock interoffice trunks for use), and "interworking"to address the needs associated with supporting interfaces with other signalling protocols (i.e. Multi-Frequency (MF)/R1 signalling).

The ISDN User Part supports services employing connections on interoffice circuits (trunks) between an originating and destination switch. ISUP has procedures and messages whose purpose and format are defined in American National Standard T1.113. Each message consists of certain mandatory parameters transmitted in fixed order together with optional parameters transmitted following the mandatory parameters. Each parameter further consists of certain fields arranged in a specified order. Most of the ISUP message appears in the MTP content portion, however ISUP uses the MTP label to identify the SP pair concerned.

All ISUP messages begin with the mandatory Message Type and Circuit Identification Code (CIC) parameters. The CIC indicates the interoffice trunk conveying user traffic for the ISUP controlled connection. The Message Type determines the message's role within the ISUP protocol and the parameters, out of the list defined in T1.113, which may occur in that message's parameter sequence. In the remainder of the document, references to ISUP messages, parameters, and fields use the names defined in American National Standard T1.113 without further reference.

SS7 applications use the Signalling Connection Control Part (SCCP) to communicate across the network for services that are not directly associated with the establishment of a circuit connection. The SCCP uses procedures and parameters whose purpose and format are defined in American National Standard T1.112.

The SCCP has two functions:

To provide connection oriented (CO) services over the connectionless (CL) MTP service.

To expand the range of addressing options available in an SS7 network by providing application-oriented, global title addresses.

Since current North American SS7 applications use only CL procedures, this invention focuses on the requirements for handling the CL message types: Unit Data (UDT), Extended Unit Data (XUDT), Unit Data Status (UDTS) and Extended Unit Data Status (XUDTS).

SCCP messages, like those of ISUP, consist of a sequence of parameters, each with a defined format. The CL messages mentioned above all contain Calling and Called Party Address parameters and a Data parameter. The Calling and Called Party Address parameters identify the SCCP users that are the message's source and destination respectively. This invention consists, in part, of procedures for manipulating the SCCP address parameters in the SMP in order to maintain normal SS7 message processing and routing functions while mediating individual messages. The Data parameter contains data conveyed transparently between these users by SCCP; typically this data is a TCAP message.

Figure 6:
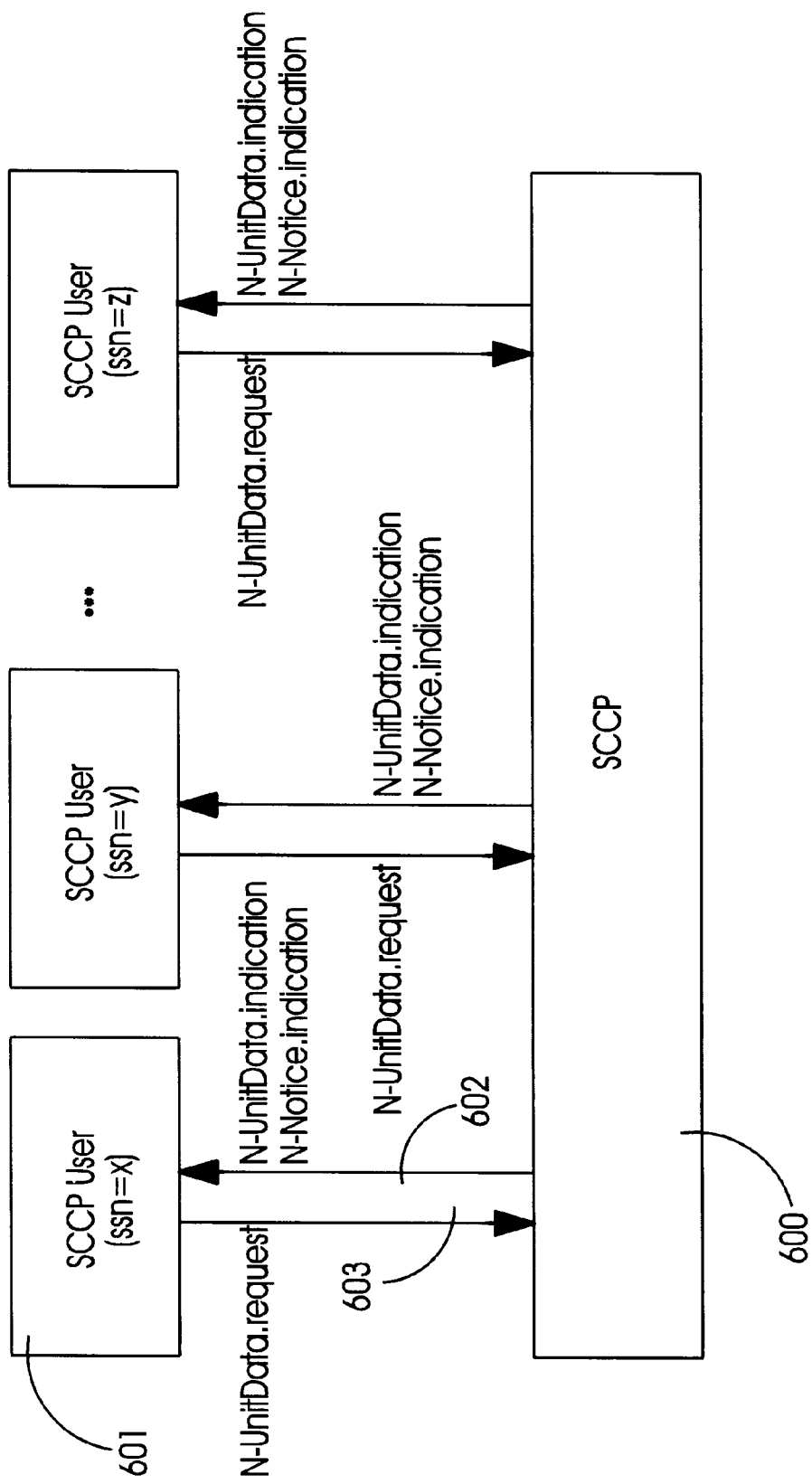
FIG. 6 shows the relationship between the SCCP and its users (sub-systems). The Figure also shows the primitives exchanged between SCCP and its users (typically TCAP implementations)

FIG. 6 shows the relationship between the SCCP and its users, identified as a collection of "sub-systems" within an SP. SCCP identifies each user sub-system by a Sub-System Number (SSN). FIG. 6 shows 3 SCCP user sub-systems, identified symbolically as "x," "y," and "z." The number of sub-systems possible within an SP is arbitrary; typical SCCP implementations provide for up to 254 sub-systems (standard addressable range).

SCCP addresses therefore identify an SP and a sub-system within that SP either explicitly or implicitly. SCCP uses two address forms: "point-code-SSN" and "global title". The point-code-SSN format identifies a sub-system by explicitly stating the point code of its destination SP and the number of the sub-system within that SP. The global title is an application-specified value that implicitly identifies a sub-system (or a set of equivalent (replicated) sub-systems). SCCP provides a Global Title Translation (GTT) procedure that transforms a global title address into the point-code-SSN form in one or more steps. Each step in the Global Title Translation process is either an intermediate or a final GTT. The final GTT generates the point-code-SSN that was implicit in the original global title value. Intermediate GTTs determine the point code of the SP at which the next (intermediate or final) translation step should take place and may (optionally) alter the global title address value.

As noted above, a global title address may refer to a set of equivalent or replicated sub-systems that provide identical services. SCCP management includes procedures that in conjunction with the Global Title Translation procedures, ensure routing of global-title-addressed traffic to an operational sub-system in case of failure or congestion of one or more members of the peer set.

The only user of the SCCP protocol identified within SS7 is TCAP. An SP places the TCAP message in the Data parameter of an SCCP message for end-to-end transmission.

TCAP provides a mechanism, the "transaction", to structure a communications session between SCCP users (sub-systems). Transaction procedures group and structure messages relating to a particular service instance.

Within the transaction, TCAP provides a remote operations service. A remote operation is a mechanism that allows an application at one Signalling Point to request an application at another Signalling Point to execute a specified operation using parameters passed from the requesting Signalling Point's application. The application performing the operation can provide specific reports of success or failure of the requested operation. These reports too, may include parameters returned by the application executing the operation.

A single transaction may comprise an arbitrary number of messages and operations. Both transaction originator and respondent can invoke operations at the other party to the transaction.

Most of the TCAP message format can be defined by using the ITU-T Abstract Syntax Number 1 (ASN.1) notation to define the number and format of the data items comprising a message. Given an ASN.1 description of message content, the Basic Encoding Rules (BER) provide rules for encoding the message for transmission. There are however some TCAP message fields that cannot be defined in ASN.1 notation. American National Standard T1.114 defines these field formats. In the remainder of this document, TCAP message fields and field values will be referenced using their American National Standard T1.114 defined names.

SS7 Network Architectures

Referring now to FIG. 1, presented is a simplified diagram which depicts a typical telecommunications network whose capabilities are controlled by Signalling System Number 7 (SS7). The diagram illustrates the physical or user network plane 100 and a signalling network plane 110. The purpose of the signalling network plane is to co-ordinate delivery of the services provided in an associated user plane (100). Signalling networks are generally comprised of a collection of interconnected "Signalling Points" (SPs) 111, all under the control of a single administrative authority (or network operator). Each SS7 Signalling Point is assigned a unique Point Code, serving as its network address for message routing.

Signalling Points 111 are Network Elements (NEs) that co-operate to provide telecommunications services to end users. The SS7 network conveys the messages between the SPs needed to enable the co-operation. The SS7 signalling links 112 that interconnect the SPs 111 constitute the signalling plane 110 used to communicate this signalling information. Liberalized interconnection will introduce new elements which, from a telephony perspective, will also be identified as "SPs" (or "Network Elements"). These elements may include voice mail systems, Interactive Voice Response systems ("IVRs"), Automatic Call Distribution ("ACD") controllers, paging systems and others.

In addition to signalling plane connections, the Network Elements in the user plane (typically End Office and Tandem switches) may be interconnected through facilities 101 used to convey user traffic. These facilities constitute the second (user) plane 100 of the overall network. The dashed lines 102 in FIG. 1 represent the fact that Signalling Points such as 111 are directly associated with a single physical Network Element which participates in both the signalling and user planes.

Every SS7 Signalling Point may be classified into one of two categories: a Signalling End Point (SEP) as for example at 111 and 114, and a Signalling Transfer Point (STP) such as shown at 113. An SEP acts only as a source and sink of signalling messages (MSUs). While an STP can source or sink MSU's, its main function is relaying messages received from one SP to another SP.

SEPs may have individual functions and certain SEPs can be further referenced by more descriptive terminology. These functional descriptions include the: Service Switching Point (SSP) and Service Control Point (SCP).

Service Switching Points are capable of sending SS7 messages to and receiving messages from other similarly equipped SS7 End Office and Tandem switches, and routing the actual calls (connecting the call path) based on the information exchanged. Incoming messages are decoded and transferred to the relevant processing function in the SSP. Outgoing messages are transmitted over the signalling links. SSPs are further equipped to halt call progress, launch an SS7 query to obtain additional routing information from an SCP, and then route or treat the call based on the information received in the SCP's response. SSPs interact with centralized resources (often "databases") to provide services and routing.

Service Control Points are often referred to as SS7 services databases. One or more SCPs can serve as central intelligence points in the network and are used to provide enhanced routing logic control for a service.

Signal Transfer Points (STPs), are special SS7 nodes which provide a message switching function between other nodes in the SS7 network. Acting as a packet switch, it examines the addresses of incoming messages and then routes them over the appropriate signalling link to the proper destination SPs. Unlike other SS7 nodes, the STP does not generally act as a source or sink for SS7 messages.

Interconnection Of Signalling Networks

In the present description, the term "SS7 network" is defined to be a collection of interconnected SPs lying within a single operational domain of control. Where there are multiple domains of control, there are multiple SS7 networks. It's also possible to have a degenerate network consisting of a single SP, however, the present description will generally identify this special case and will refer to this as an individual SP and not as a network.

In FIG. 1, all SPs 111 were shown in a single domain of operational control. In practice, network operators are concerned with interconnecting SPs in multiple operational control domains. When dealing with multiple operational domains, it is convenient to assume the point of view of the operator of a particular domain. From that operator's viewpoint, its own domain/network is distinguished as the internal domain/network. All SS7 networks and SPs outside this distinguished domain are external networks or SPs respectively.

The distinction between internal and external networks/ Signalling Points is significant. The SPs making up the internal network are under the network operator's control and can be managed by the operator to ensure proper interoperability and security of communications between the various SPs. When interconnecting with external networks and Signalling Points, however, a network operator must use indirect controls to ensure that signalling across the interconnect interface and the interworking relationships it controls, does not disrupt the internal network or its constituent SP's. Mediation, the subject of this invention, is one such indirect control.

Figure 2A:
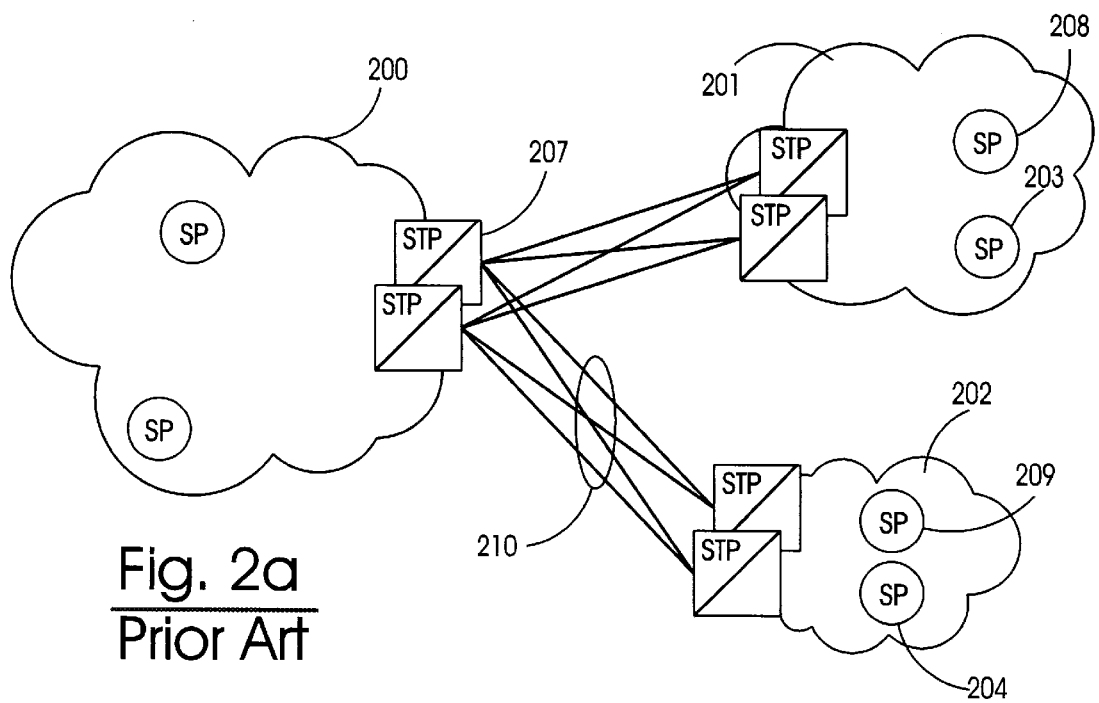
FIGS. 2a and 2b are diagrams illustrating signalling network interconnection scenarios typically supported within the industry for interconnections between internal and external networks.
Figure 2B:
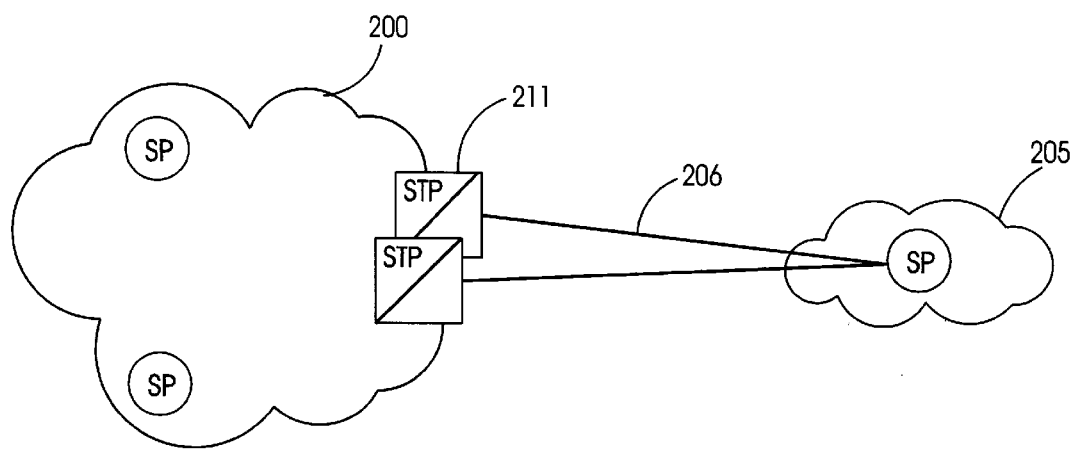

Referring now to FIGS. 2a and 2b, network-to-network and network-to-Signalling Point interconnection scenarios, respectively have been presented. FIG. 2a, shows an example of a scenario with SS7 networks 200, 201 and 202 operating as three separate domains. Each includes several individual SPs controlled by separate authorities or network operators. For example, SPs 203 and 204 are outside the control of network 200. Here, consider interconnection architectures from the viewpoint of the operator of the network 200, which therefore, becomes the internal network for this example. The remaining networks 201 and 202 become external networks for the purpose of the example.

The simplest form of interconnection, shown in FIG. 2b, is a direct connection between the internal network 200 and a single external SP 205 over an SS7 combined link set 206.

In the scenario of FIG. 2a, an interconnection is made between the internal SS7 network 200 and external networks 201 and 202. External networks 201 and 202 may contain an arbitrary number of Signalling Points such as 203 and 208, and 204 and 209, respectively.

Those generally skilled in the art, assume that external networks connect to a mated STP pair 207 in the internal network through a "quad" of D-links 210. While it is technically feasible to connect an external SP directly to an SEP in the internal network, this restricts communication to take place only between the external SP and the internal network's SEP. If the external SP requires signalling associations with more than one SP in the internal network, this would necessitate implementation of additional signalling links interconnecting the external SP with the other internal SPs. It is, therefore, more efficient to centralize the interconnection at an STP pair 211 capable of relaying traffic to any SP in the internal network with which the external SP can form a valid signalling association.

DESCRIPTION OF THE PREFERRED EMBODIMENTS

As indicated previously, in order to fulfil the requirements for mediation, the Signalling Mediation Point (SMP) must be able to access all significant traffic crossing the interface between the internal network 200 and external networks 201, 202 of FIG. 2a and external network/SP 205 of FIG. 2b. The method for ensuring that this requirement is met depends upon the form of network interconnection and the placement of the SMP at (or near) the interface (cf: FIGS. 3, 8 and 9). Furthermore, once an MSU has reached the SMP and undergone analysis and mediation, the SMP must then be able to route the MSU on to its correct internal or external destination Signalling Point.

The network interconnection architecture for the SMP must reconcile several conflicting requirements. The SMP should minimize the amount of time spent processing any particular MSU so as to add the minimum possible interval to the MSU's time of transit between its originating and destination SPs. In conflict with this is the requirement that the SMP carefully examine each MSU to ensure that all mediation functions required for the MSU are carried out. The SMP must therefore provide extremely efficient and reliable processing of MSUs.

Experience shows that the attacks of those seeking to breach network security can be extremely sophisticated. It is not possible to predict the nature of all possible attacks in advance. However, if the SMP is sufficiently flexible, it will be possible to adapt it quickly in order to meet newly detected threats. This requirement for architectural flexibility conflicts somewhat with the requirement for maximum efficiency of operation since it is simpler to optimize architectures when all requirements are known in advance. An SMP architecture according to the present invention will be described further below.

The present invention characterizes the SMP's network functionality as an SS7 Signalling Point (SP) whose functions depend upon whether or not the SMP has the SS7 Message Transfer Part (MTP) transfer capability. An SS7 SP with transfer capability is called a Signalling Transfer Point (STP) and a SMP with this capability is called "STP-like". SS7 SPs without the transfer capability are signalling end points (SEP). A corresponding SMP is called "SEP-like".

An STP-like SMP has the capability to receive MSUs addressed to other SPs, mediate the MSUs and route them on to the destination SP addressed in the MSU. An SEP-like SMP can only accept MSUs addressed to the SMP itself (an incoming MSU with any other destination address will be discarded). Such an SMP must therefore, determine a new destination address for the SMP as well as perform the same mediation functions as the STP-like SMP. This basic difference in SMP capability affects not only the SMP itself, but also the methods required for addressing and routing traffic in the SS7 networks and signalling points interconnected through the SMP.

This distinction (STP-like vs. SEP-like) is significant mainly because an SEP-like SMP must invoke a procedure to determine a new destination address for a received, mediated MSU. An STP-like SMP may also either use such a procedure, or route the MSU on toward the destination address already contained in the received MSU.

In the present invention, a Signalling Mediation Point is a distinct signalling point located on or near the periphery of a particular SS7 network, the internal network. The system and method of the present invention enables its embodiment in several distinct interconnection architectures.

SEP-Like SMP

Figure 3:
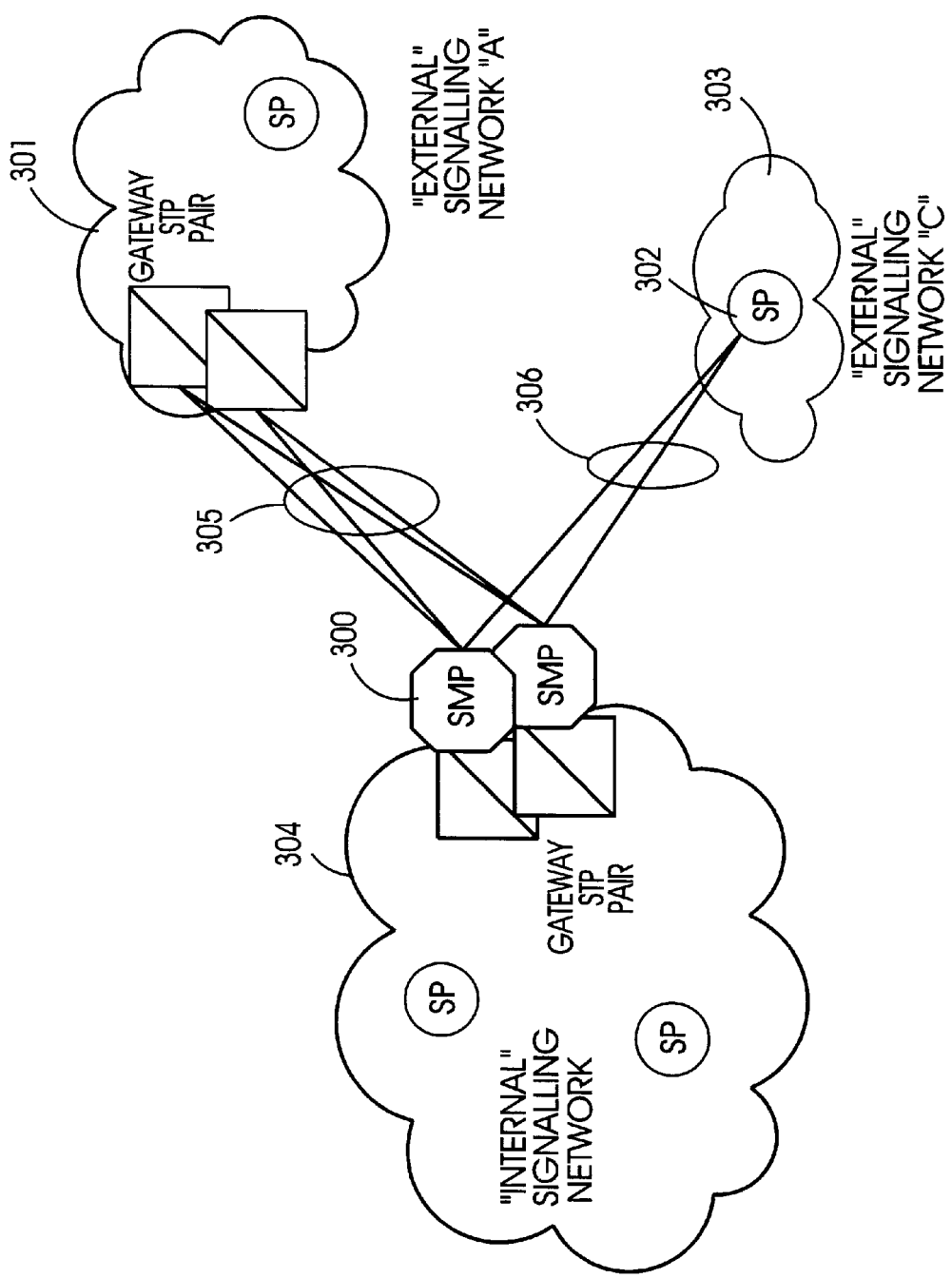
FIG. 3 is a diagram illustrating the placement of a mated pair of Signalling Mediation Points (SMPs) without message transfer capability at the internal network's boundary according to a first embodiment of the invention.

In the embodiment of FIG. 3, a mated pair of SMPs 300 is placed at the internal network's boundary. In this embodiment, the SMPs do not have MTP message transfer capability. An external network 301 or SP 302 of network 303 desiring interconnection with the internal network 304 communicates through signalling links 305 and 306 terminating on the SMP pair 300.

This configuration, together with the lack of MTP transfer capability in the SMP 300, ensures that all traffic originating from, or destined to, an external SP must pass through the SMP 300 and be addressed to a Destination Point Code (DPC) identifying the SMP 300 itself. The characteristics of this SMP configuration provide a simple solution to the problem of ensuring that all traffic subject to mediation reaches the SMP 300, but create new limitations for end-to-end routing of an MSU through the SMP.

End-to-end routing in this context refers to the path followed by an MSU originating in the internal (external) network and destined to an external (internal) SP. Since the DPC in the incoming message identifies the SMP 300, the SMP 300 must determine a new DPC for the MSU in order to route it on to its true external (internal) destination.

Figure 4:
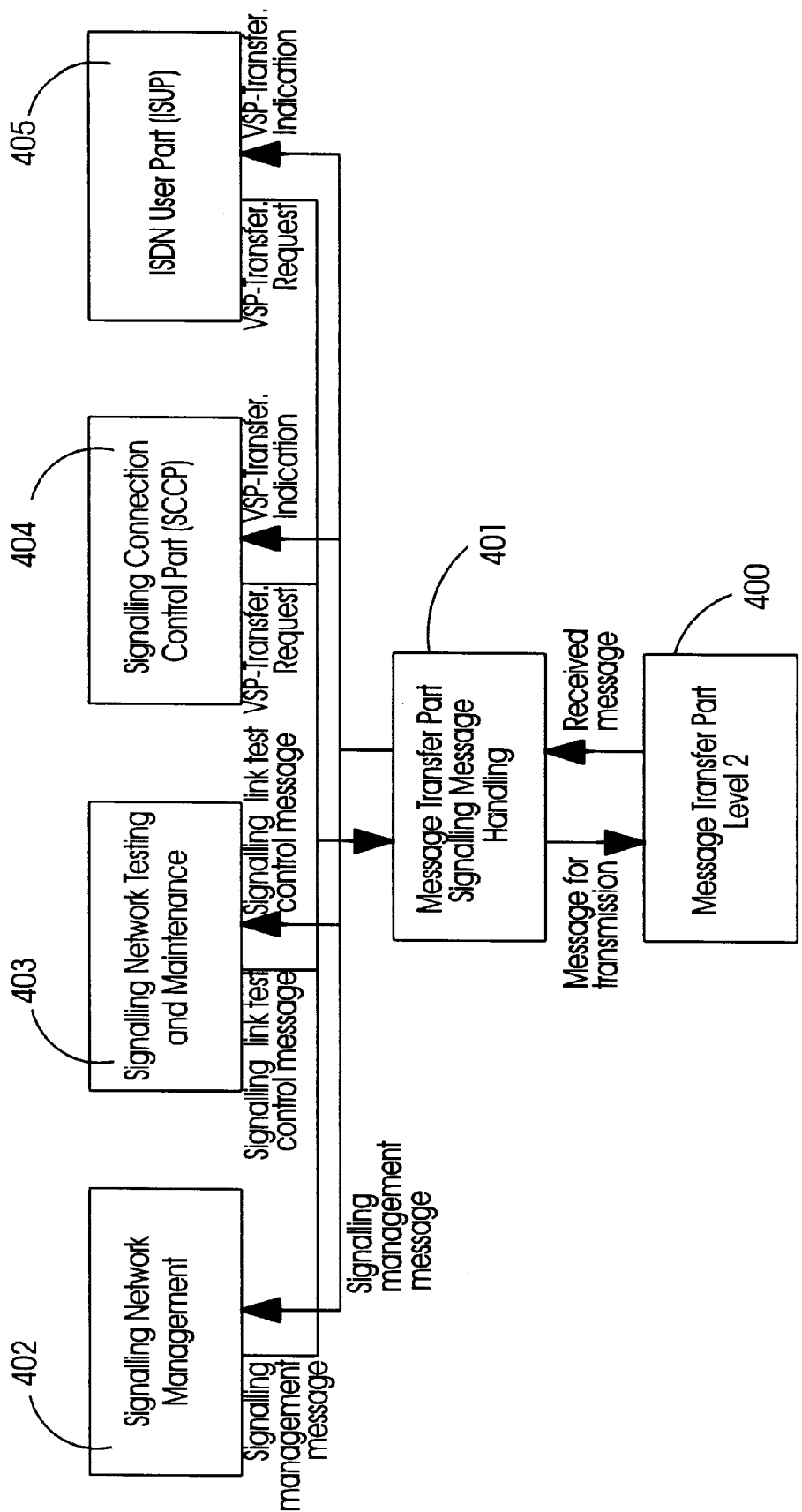
FIG. 4 is a block diagram showing the relationships between various parts of the SS7 protocol.

FIG. 4 shows, for a preferred embodiment of the invention, a functional block diagram of the relationships between the MTP and its users in an SP.

The method that the SMP uses to route MSUs depends upon the MTP user part associated with the MSU. As illustrated in FIG. 4, the SS7 protocol has several individual protocol parts that access SS7 signalling links indirectly through the MTP Level 2 400 and MTP Signalling Message Handling 401 in order to deliver the overall SS7 functionality. These MTP user parts are the MTP management functions (identified as Signalling Network Management 402 and Signalling Network Testing and Maintenance 403), the Signalling Connection Control Part (SCCP) 404, and the ISDN User Part (ISUP) 405. The Service Indicator field in the MSU's Service Information Octet identifies the protocol part that generated (source)/will use (sink) the MSU. (Not shown in FIG. 4 is TCAP which uses SCCP services 404 to access the network.) Within the embodiment of FIG. 4, the MTP management, ISUP and SCCP/TCAP messages will each be managed differently.

With reference to blocks 402 and 403, MTP Management messages convey information concerning the status of SPs and routes in the SS7 network. When the SMP is SEP-like, as in the embodiment of FIG. 3, it acts as the terminal point for any management messages received, whether from internal or external network SPs. As such, it is not appropriate in an SS7 protocol sense for the SMP to directly propagate management information received from the internal network to an external network or SP. Similarly, management information received from an external network or SP should not be directly propagated to the internal network.

This simplifies the general mediation problem since the SMP acts as an impermeable boundary preventing transfer of unwanted MTP management information between internal and external SPs. However, when one network (internal or external) has informed the SMP that a certain SP is inaccessible or that message transfer to the SP is restricted, the SMP must implement protocol part dependent methods for handling messages originating from the other network and destined to the impacted SP.

With reference to 405, ISUP traffic uses MTP point code routing between its originating and destination SPs, both of which are assumed here to be Central Office switches terminating the interoffice circuits to be supervised by the ISUP messages. Since the SMP is not a switch, the traffic will not be routed to the SMP. If in spite of this, the internal (external) SP configuration is set to indicate the SMP as the proper destination point for ISUP traffic in order to enable mediation of the traffic, then the SMP will receive the ISUP MSU but it lacks information concerning the proper final external (internal) destination for the traffic following execution of its mediation functions. Accordingly, the present invention introduces the concept of the Virtual Signalling Point (VSP).

The Virtual Signalling Point (VSP) is invented as a means of providing the SMP with information required to route a received MSU on toward its intended final destination using information contained in the MSU (OPC and DPC fields) together with a table maintained in the SMP. This method causes an internal (external) SP to perceive the VSP as its destination SP for the message rather than the intended external (internal) SP. Although the VSP does not exist as a separate Network Element, the internal and external SPs perceive it as an NE due to alterations made in MSUs by the SMP.

Like a real SP, a VSP is identified by its signalling point code. However, unlike a real NE, the VSP signalling point code provides a unique mapping between the originating internal (external) SP and the true terminating external (internal) SP in addition to enabling routing of messages to the SMP. A preferred embodiment of the invention operates as follows:

The internal network operator defines the signalling relationships allowed to exist between the internal and external signalling points and records these relationships in a map $\mathcal{R}$ maintained within an SMP with VSP capabilities.

Each element, $r_i$, in $\mathcal{R}$ has the form $((v_i, o_i), c_i)$. The key (set) for this map consists of point code pairs $(v_i, o_i)$, where $v_i$ is a VSP point code and $o_i$ is the OPC for a message. The map element value, $c_i$, is the point code of an SP whose signalling relationship with $o_i$ is mediated through the VSP. Further, $\mathcal{R}$ is constructed such that for any element $((v_i, o_i), c_i)$ $\mathcal{R}$ there is a corresponding element $((v_i, C_i), o_i)$ also in $\mathcal{R}$. This enables bi-directional communication between $o_1$ and $c_i$ mediated by $v_i$.

Figure 5A:
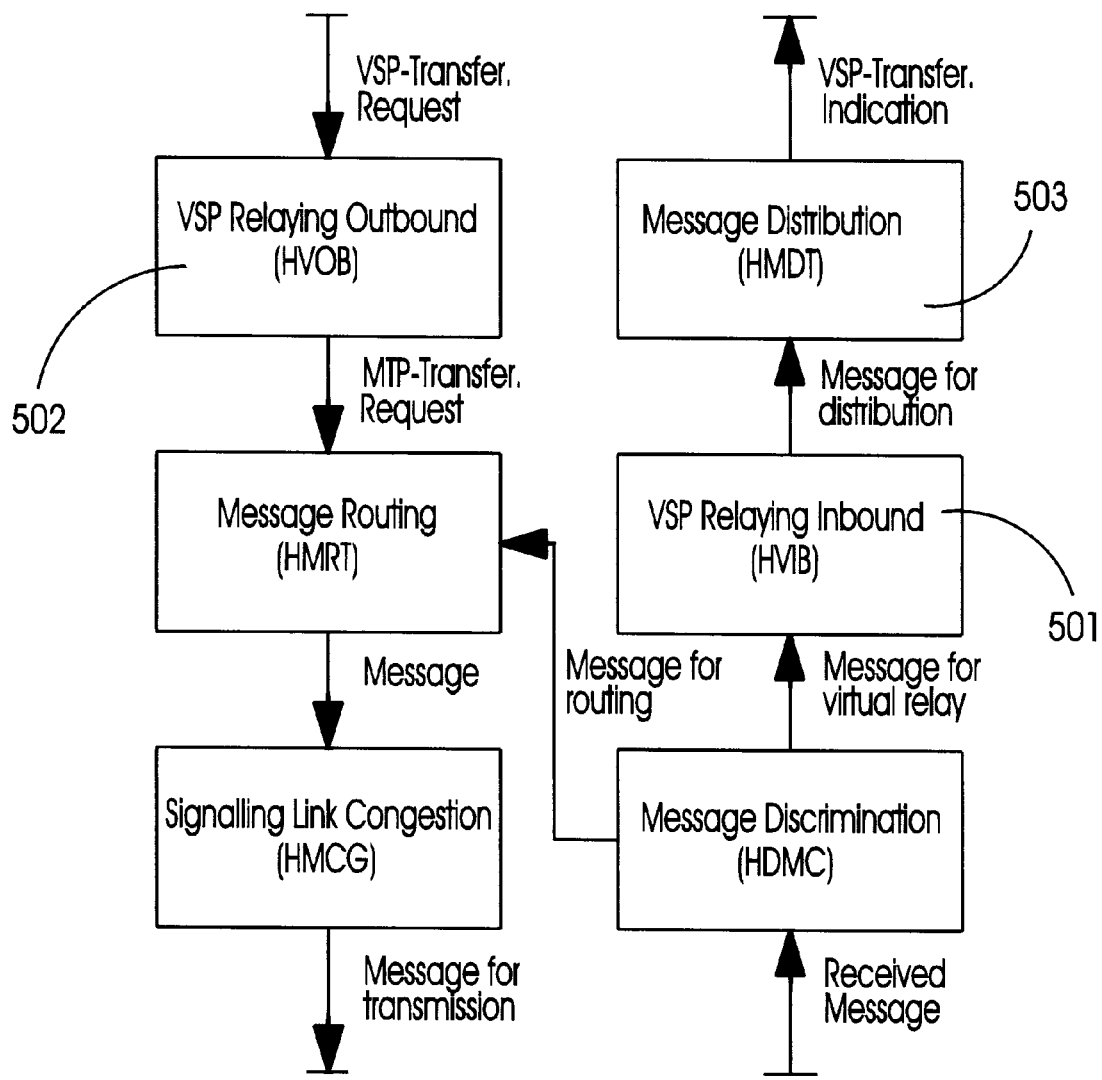
FIG. 5a is a block diagram showing how Virtual Signalling Point (VSP) procedures are inserted into the existing signalling message handling procedures of the MTP at an SMP.

FIG. 5a presents a more detailed view of the MTP Signalling Message Handling function within the SMP (cf: FIG. 4, block 401) showing the insertion of functional blocks for VSP Relaying Inbound (HVIB) 501 and VSP Relaying Outbound (HVOB) 502 of MTP messages. These two functional blocks execute the procedure defined by the SDL diagrams found in FIG. FIG. 5b (HVIB) and FIG. 5c (HVOB) respectively. The VSP function replaces the existing MTP-Transfer primitive with a new primitive, VSP-Transfer, that provides an additional parameter, vpc. The point code vpc identifies the VSP in a signalling relationship between an originating SP (identified by point code opc), the VSP, and a destination SP (identified by point code dpc).

The preferred embodiment of the invention also allows these parameters to take on a distinguished "null" value, identified by the symbol $\phi$, in special circumstances. Parameter opc may be $\phi$ for transmission of a message originated within the VSP itself. Parameter vpc is $\phi$ for messages handled by the SMP that do not use the VSP function.

Figure 5B:
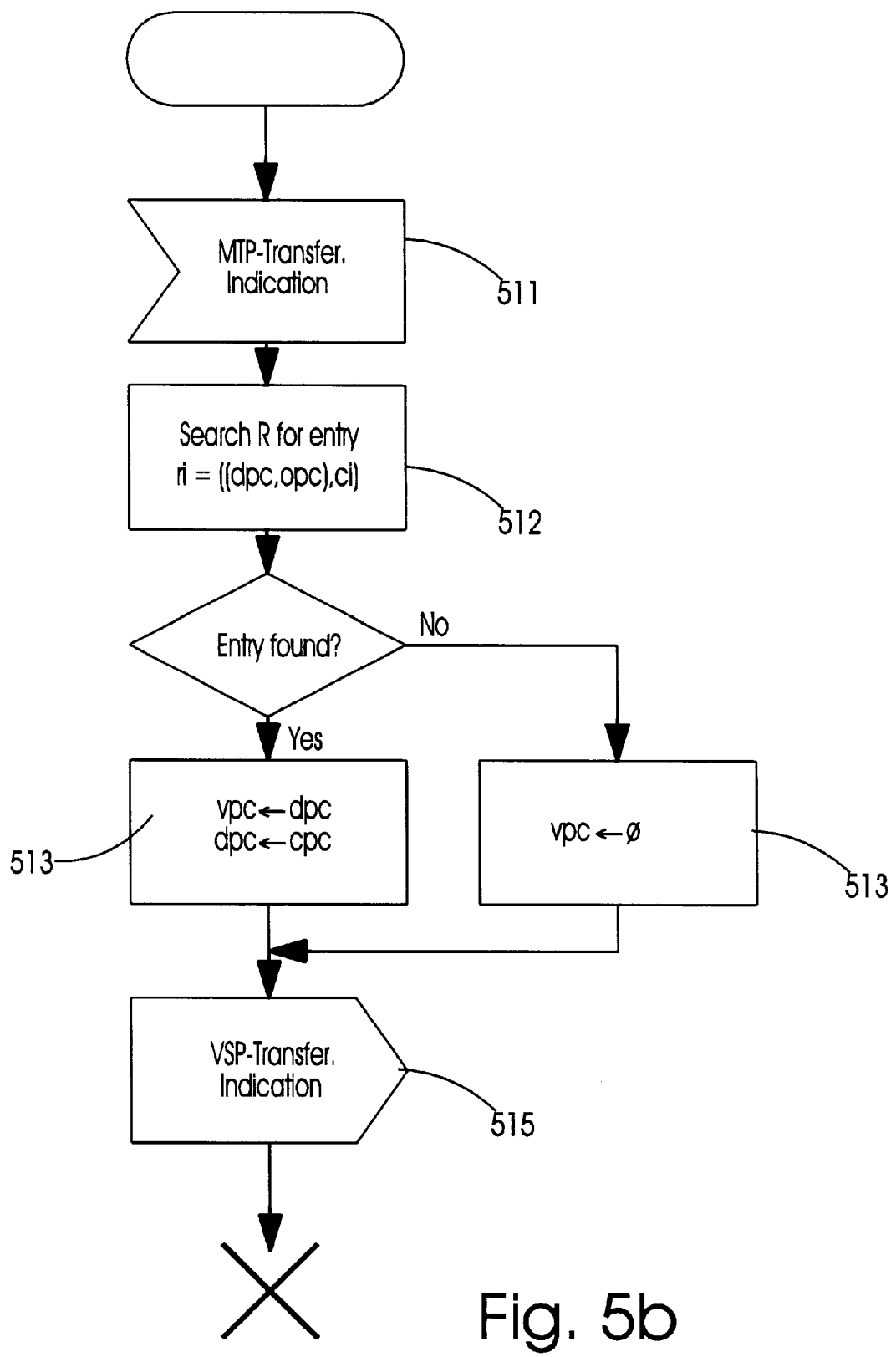
FIG. 5b is a Specification and Description Language (SDL) procedure for handling an incoming MSU that may be addressed to a Virtual Signalling Point contained within an SMP.
Figure 5C:
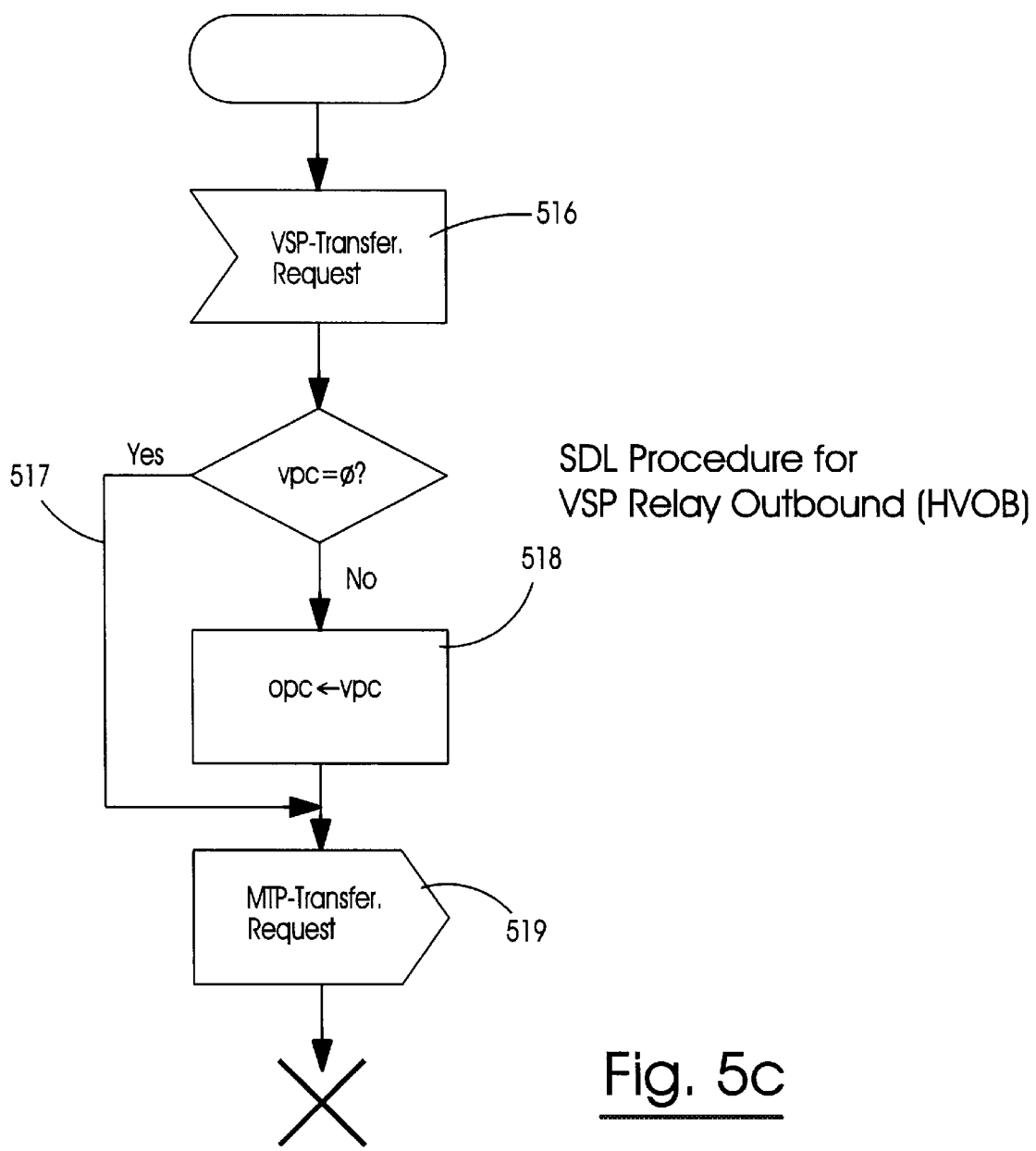
FIG. 5c is an SDL which shows the procedure for handling an MSU outgoing from the SMP that may use the VSP procedure for addressing and routing.

A preferred embodiment of the SEP-like SMP of FIG. 3 implements the generalized method described above into the procedure described by the SDL of FIGS. 5b and 5c and in textual overview form below, for handling any messages that it receives.

I. On receipt of an inbound MTP-Transfer.indication primitive 511, search the virtual signalling relationship map $\mathcal{R}$ 512 using the Originating and Destination Point Code parameters (opc and dpc respectively) as the key. Select the element, $r_i=((dpc, opc), c_i)$ in $\mathcal{R}$ that describes the signalling relationship controlling the message. The existence of such an element, $r_i$, implies that dpc is a VSP point code and that $c_i$ is the point code of the third SP involved in the mediated signalling relationship. The relaying function sets the vpc parameter to $c_i$.

II. If there is no such element 513, $r_i$, then dpc is not a VSP point code and therefore the relaying function sets parameter vpc to $\phi$.

III. The relaying function passes the message to the Message Distribution (HMDT) functional block 503 of FIG. 5a which issues the VSP-Transfer.indication primitive 515 to the MTP user protocol part 404 or 405 in FIG. 4 identified by the received SIO parameter.

IV. Other functional blocks in the SMP now execute any mediation functions required for the message contained in the User Data parameter of the primitive. After mediation, such a functional block 404 or 405 issues a VSP-Transfer.request 516 in FIG. 5c to the VSP relaying outbound function. Parameter values opc, dpc, and vpc of the Request primitive are copied from the corresponding parameters of the Indication primitive in order to route the message on toward the correspondent SP, $C_i$.

V. On receipt of a VSP-Transfer.request primitive, the VSP outbound relaying function examines parameter vpc. If vpc takes the value $\phi$ 517, there wasn't any VSP involvement and HVOB simply transforms the VSP-Transfer.request into an MTP-Transfer.request. Otherwise the relaying function replaces the opc value by vpc 518 and then issues an MTP-Transfer.request primitive 519, copying all parameter values from the corresponding parameters of the VSP-Transfer.request.

The overall effect is that the internal (external) SP sees the virtual image presented by the VSP as its correspondent instead of the real external (internal) SP. Within the SMP, message handling is normal except that the SMP maintains an extra data item, the VSP point code, as it processes the message. If mediation processing determines that it's necessary to return the message (or a modified message) to its originating SP, rather than relaying it onward to the correspondent destination, the SMP transposes the opc, dpc values while executing the procedures just prior to the emission of the corresponding VSP-Transfer.request 517, 519.

Although introduced in connection with ISUP traffic routing, the VSP procedure can also be used to route traffic to the SCCP function 404, when the traffic is addressed by point-code-SSN rather than by global title. However, the handling of such SCCP traffic may also depend on the types of the TCAP messages carried within SCCP User Data parameters. The proper handling of these messages must consider the associations maintained between SPs by TCAP transactions.

It should be noted that although the above-described procedure is used in conjunction with SS7 signalling protocols, it may be modified to operate with equivalent network protocols, wherein destinations are identified by the address of network elements and sub-addresses of applications within each element.

The following methods specify SMP procedures used to monitor TCAP associations/transactions.

TCAP Association Procedures

In addition to TCAP transaction monitoring requirements, the use of SCCP global title addressing services imposes different requirements on the SMP than those required for point code based message routing. For SCCP traffic handling in an SEP-like SMP using the preferred embodiment of FIG. 3, the present invention introduces a method of real-time association tracking. The real-time association method enables the SMP to obtain and correlate SCCP addressing information so that the SMP can correctly route traffic between internal and external SPs.

An "association" is a connection between two processes in the application layer of open systems. In signalling applications, the application processes are concerned with the delivery of telecommunications services to network users. The telecommunication services may be basic call and connection control or complex combinations of basic and supplementary services. SPs form and break associations as required in order to deliver services.

There is no association between messages within the CL SCCP protocol. SCCP relays each unit data message transferred independently of any other message transferred. The SMP therefore, uses the TCAP messages carried in SCCP data in order to associate the messages making up a TCAP transaction with one another.

A preferred embodiment of the invention therefore processes SCCP messages by routing them to an SCCP user sub-system, as shown in FIG. 6. FIG. 6 is a block diagram showing the SCCP 600 and several of its user sub-systems 601 at an SMP. Using known methods, MTP routing delivers MSUs to the SMP (the message's Destination Point Code is that of the SMP, otherwise the message will be discarded) and the SCCP receives messages from the MTP (as shown in FIG. 4, 404) and routes them to the sub-system selected by the SCCP Called Party Address. The message transfer from SCCP 600 to SCCP user 601 uses the N-UnitData.indication service primitive 602. SCCP user 601 to SCCP 600 message transfers use the N-UnitData.request primitive 603. SCCP 600 will also provide notifications to its users when it is impossible to transfer a message to a requested destination sub-system via an N-Notification.indication service primitive.

Figure 7A:
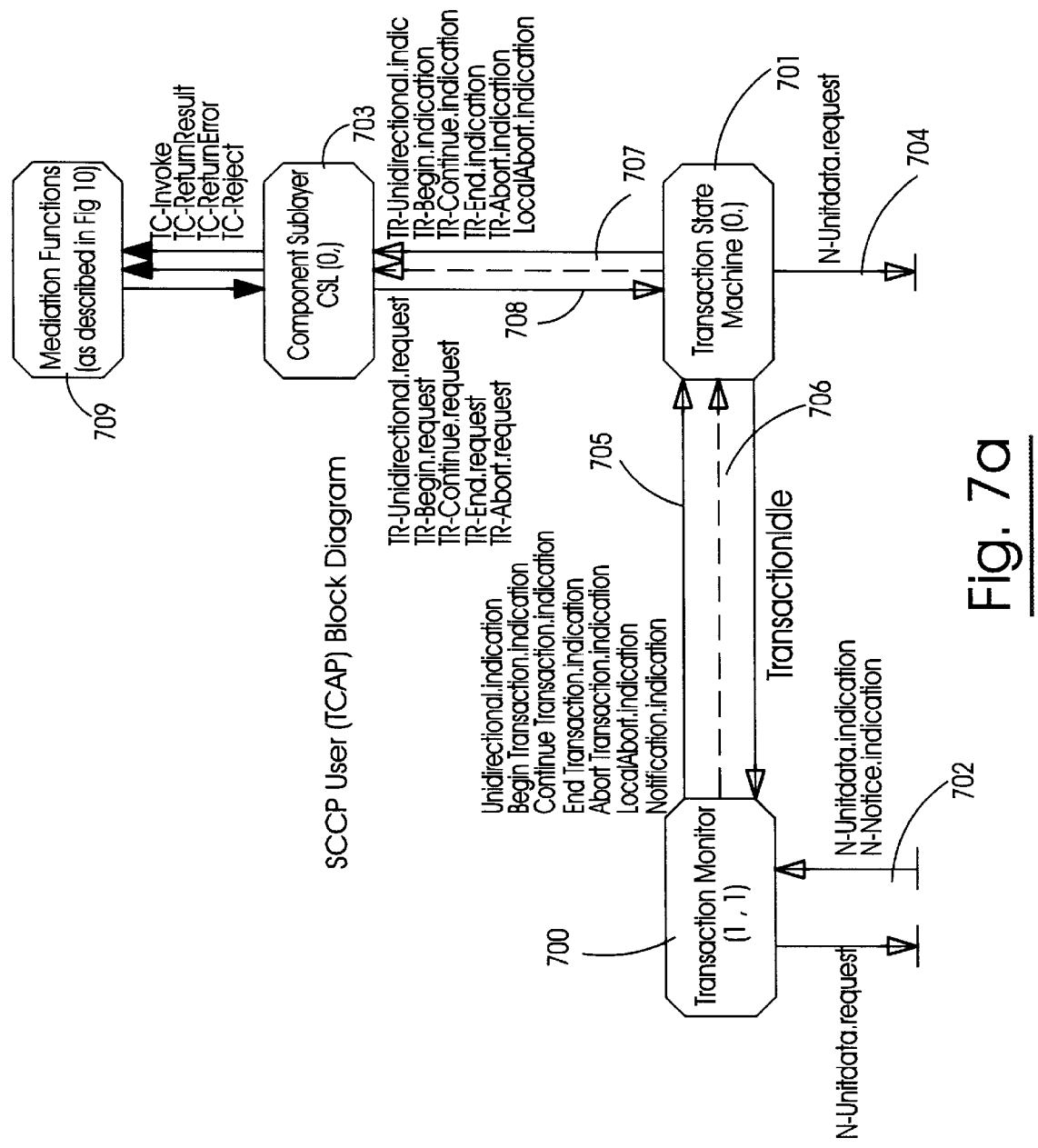
FIG. 7a shows the structure of an SCCP user (sub-system) implementing the Transaction Capability Application Protocol (TCAP) in a preferred embodiment of the invention.

FIG. 7a shows the structure of an SCCP user (sub-system) implementing the Transaction Capabilities (TC) application protocol in a preferred embodiment of the invention. The implementation consists of a Transaction Monitor (TM) process 700 that distributes 705 incoming messages 702 to the Transaction State Machine (TSM) process 701 handling the individual transactions/associations to which the messages pertain. The TM creates new TSM processes as required to control new transactions received by the SMP 706.

The TSM process maintains the basic state of an individual transaction using information extracted from SCCP N-UnitData, indication parameters 702 and the transaction portion of the TCAP message. In a preferred embodiment of the invention, messages forming transactions between internal and external network SPs are each split into two subordinate transactions which are coordinated by the TSM. The first subordinate transaction is between the SP (originating SP) that initially transmits a query message for a transaction and the SMP. The second subordinate transaction is between the SMP and the SP (destination SP) that receives the query message after having been mediated at the SMP. The transaction co-ordination function performed by the TSM co-ordinates the subordinate transaction to create an association between the originating and destination SP's.

The TSM 701 creates 707 a Component Sub-layer (CSL) process 703 to handle individual components of the received messages. On receipt of a message from the TM 700, the TSM 701 extracts the information that it requires to co-ordinate the transactions from the message and then passes it to the CSL 703. The CSL 703 further decodes the message and interfaces to mediation functions within the SMP. (The CSL is an implementation of TCAP component portion decoding and processing procedures and does not itself represent any novel invention). After mediation (and possibly component portion reformatting in the CSL), the message returns 708 to the TSM 701 for reconstruction of its transaction portion. Finally the TSM 701 uses the N-UnitData.request primitive 704 to request the SCCP to relay the message on towards the destination internal or external SP.

Figure 7B:
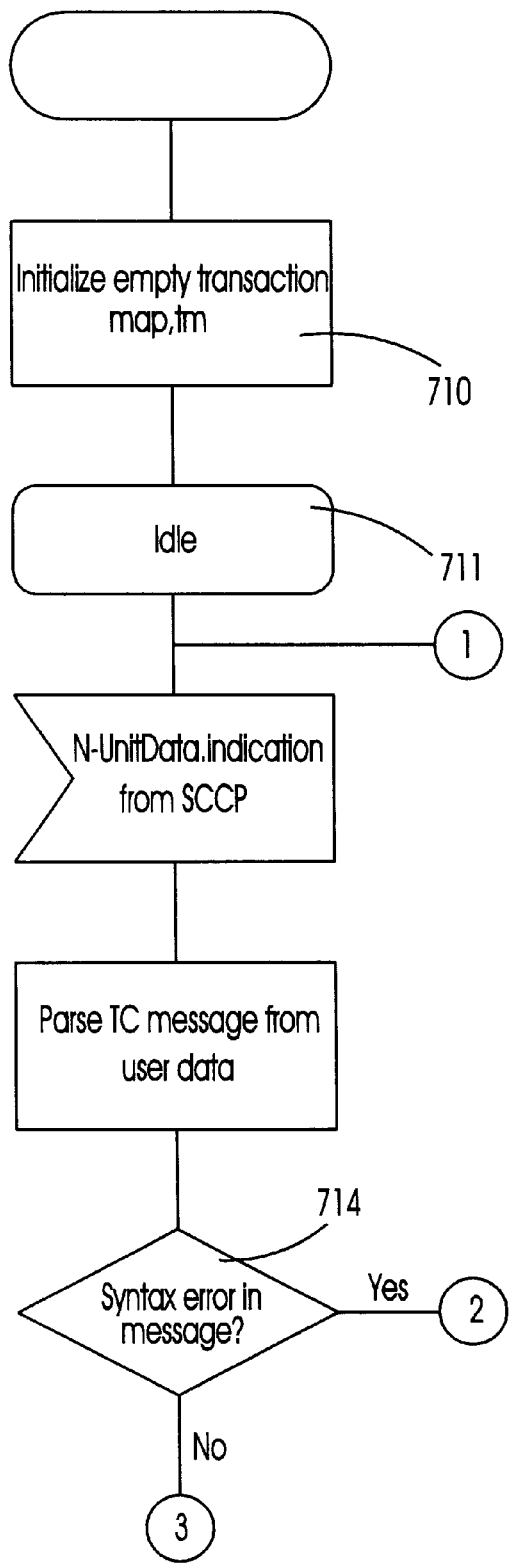
FIGS. 7b and 7c show process diagrams for the Transaction Monitor and Transaction State Machine processes respectively.
Figure 7B:
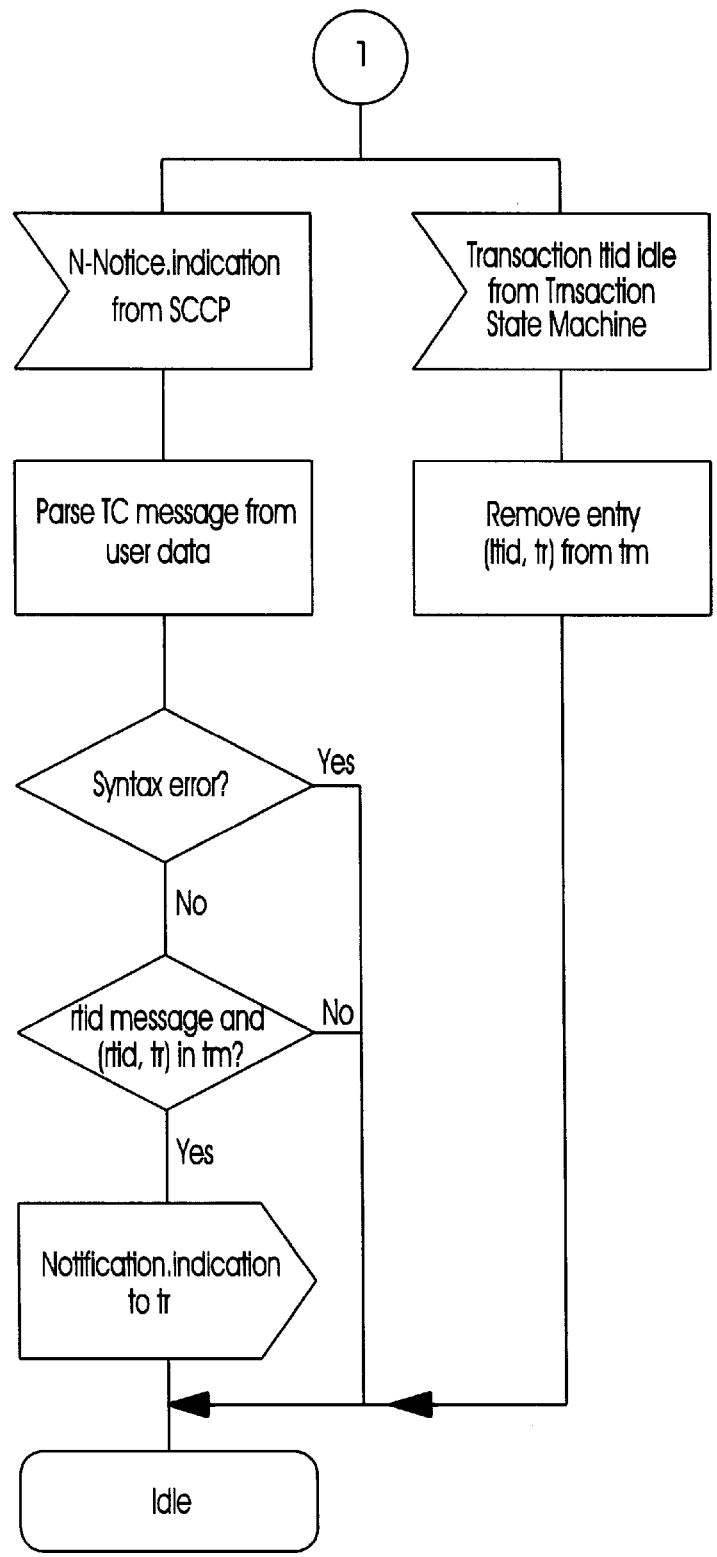
Figure 7B:
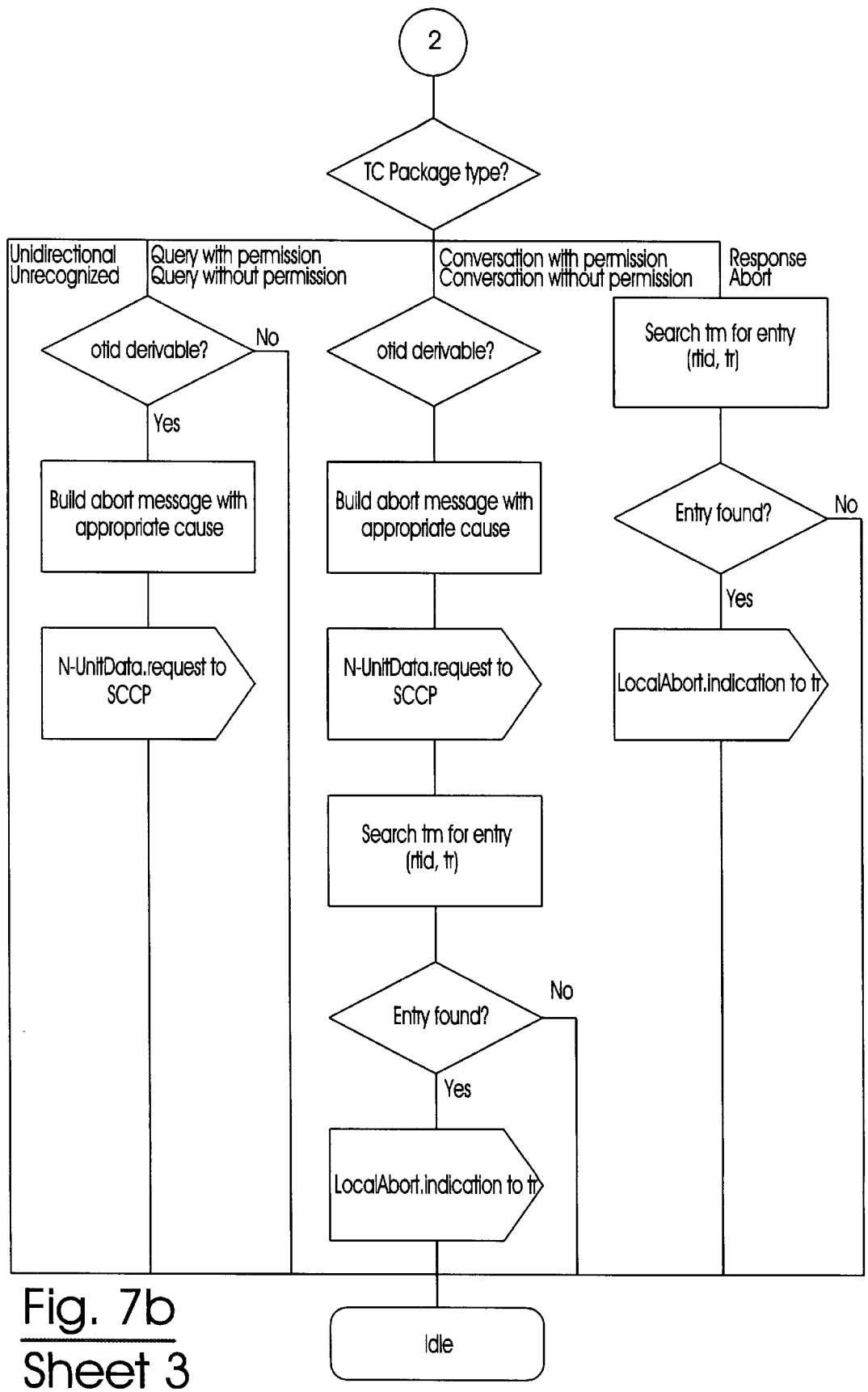
Figure 7B:
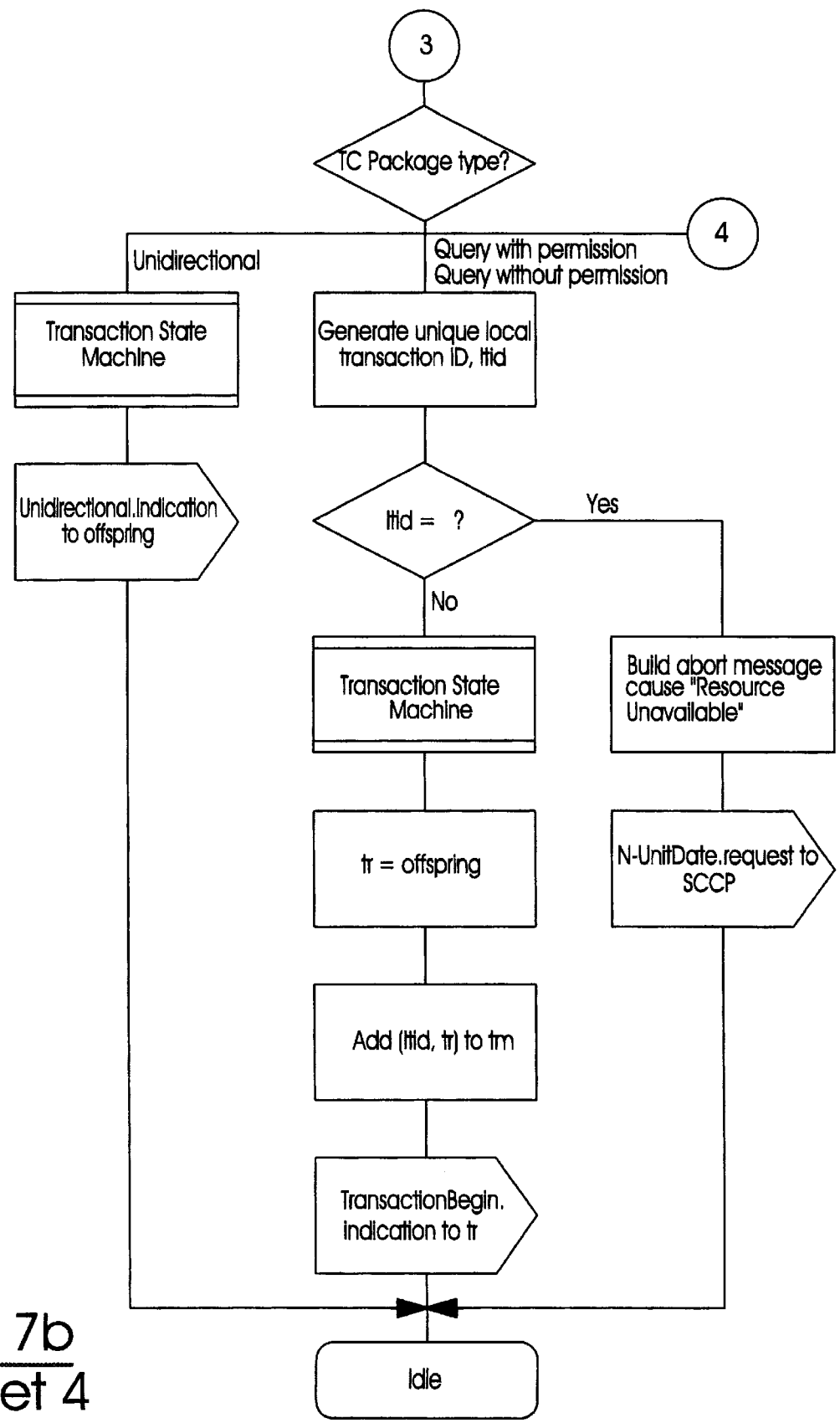
Figure 7B:
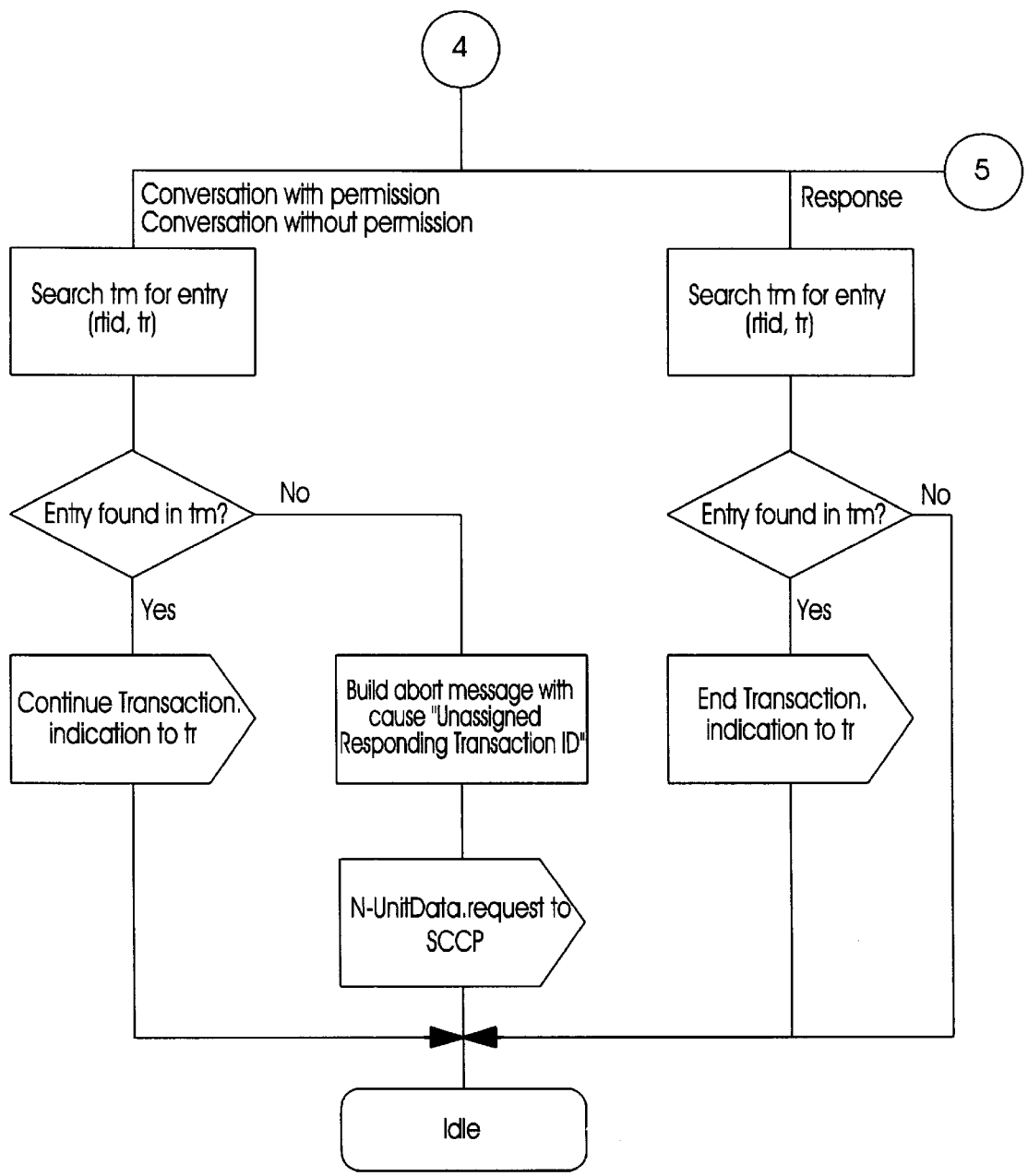
Figure 7B:
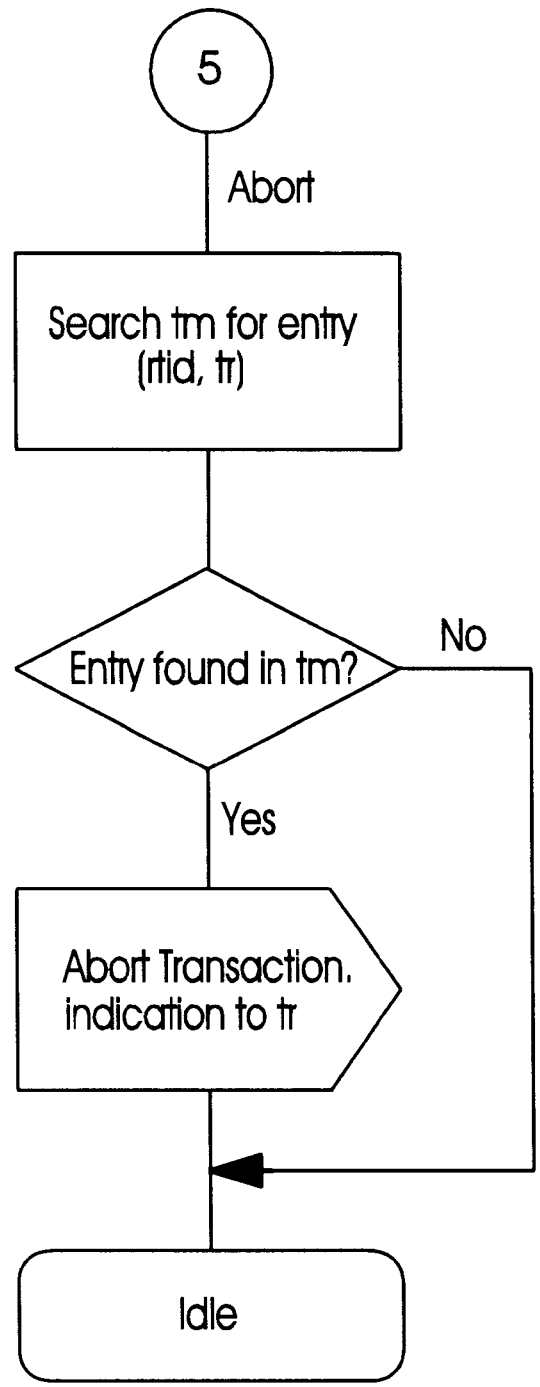
Figure 7C:
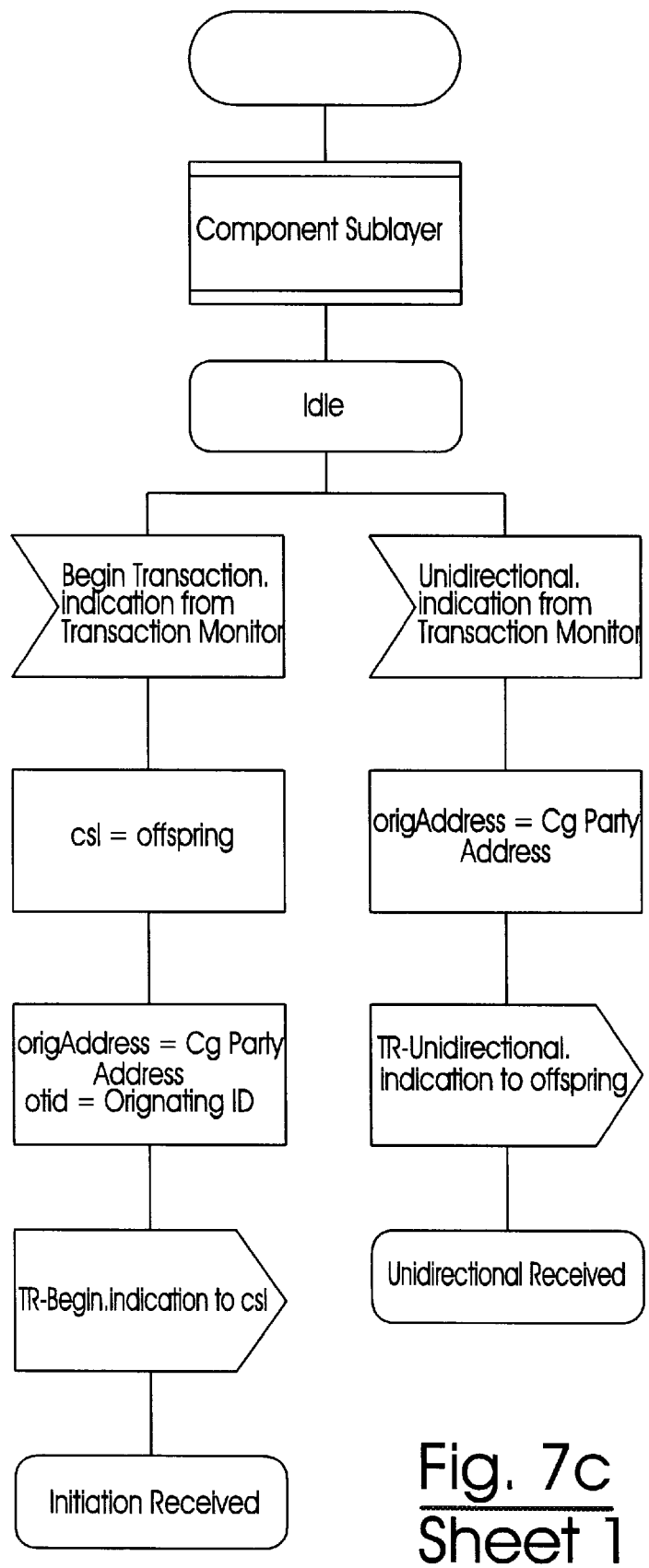
Figure 7C:
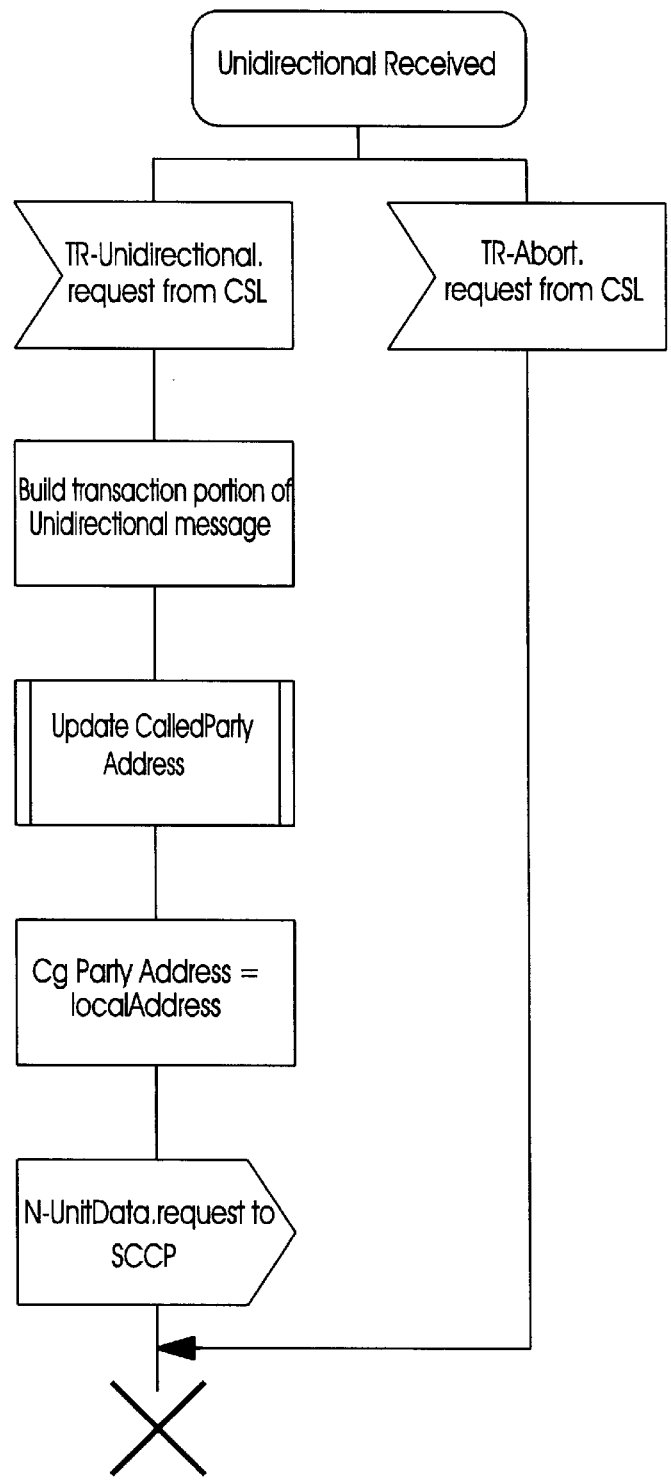
Figure 7C:
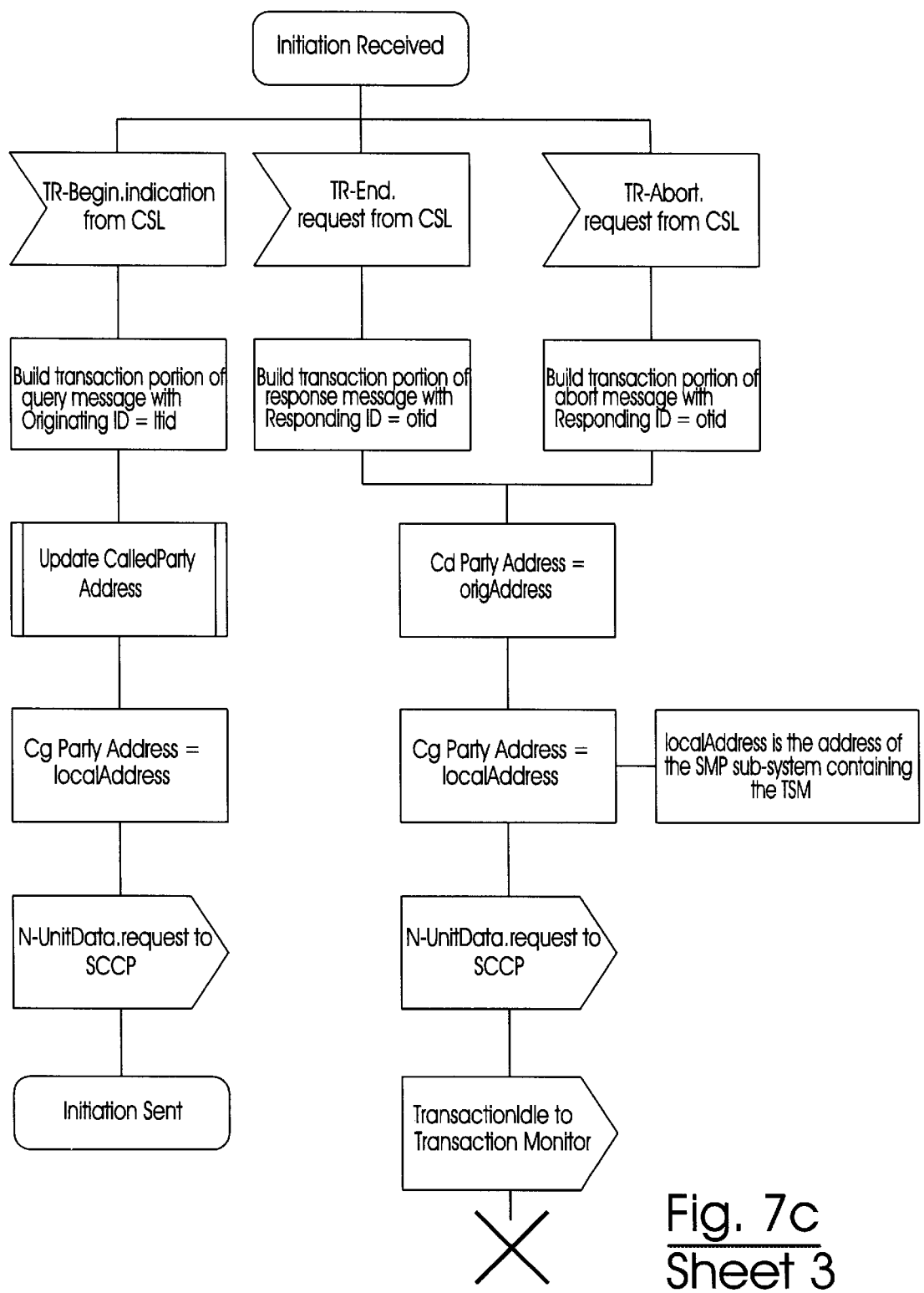
Figure 7C:
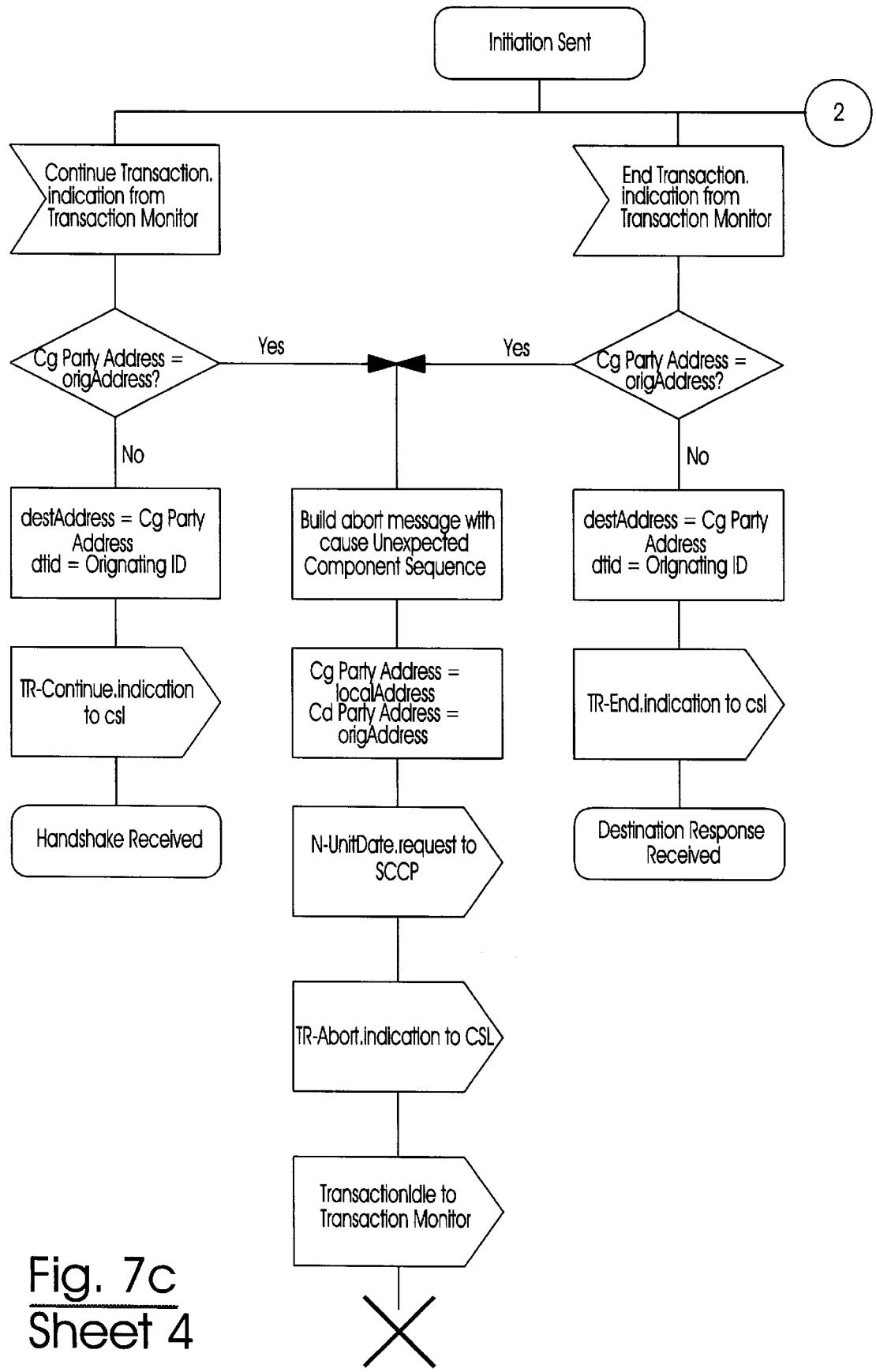
Figure 7C:
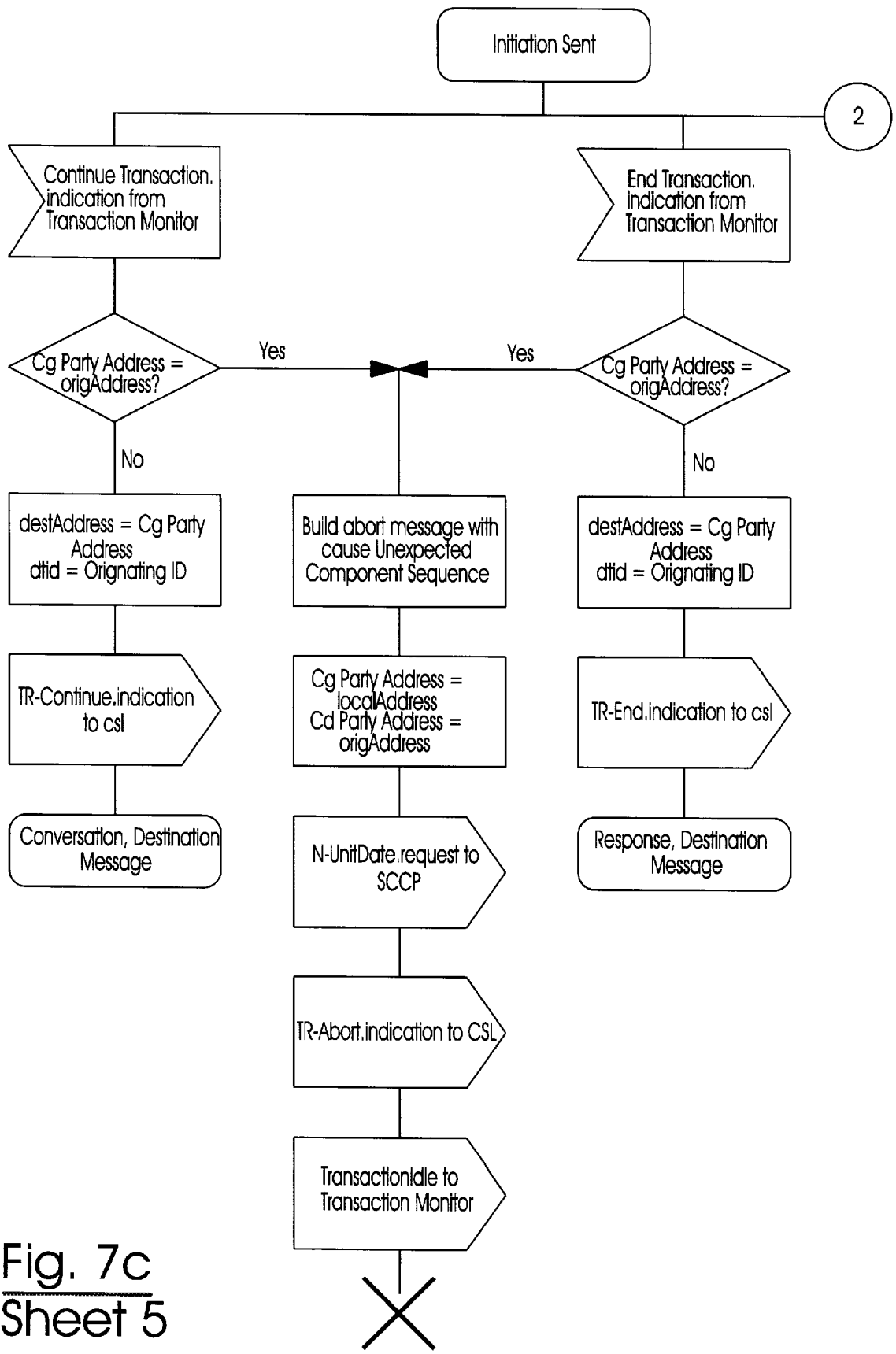
Figure 7C:
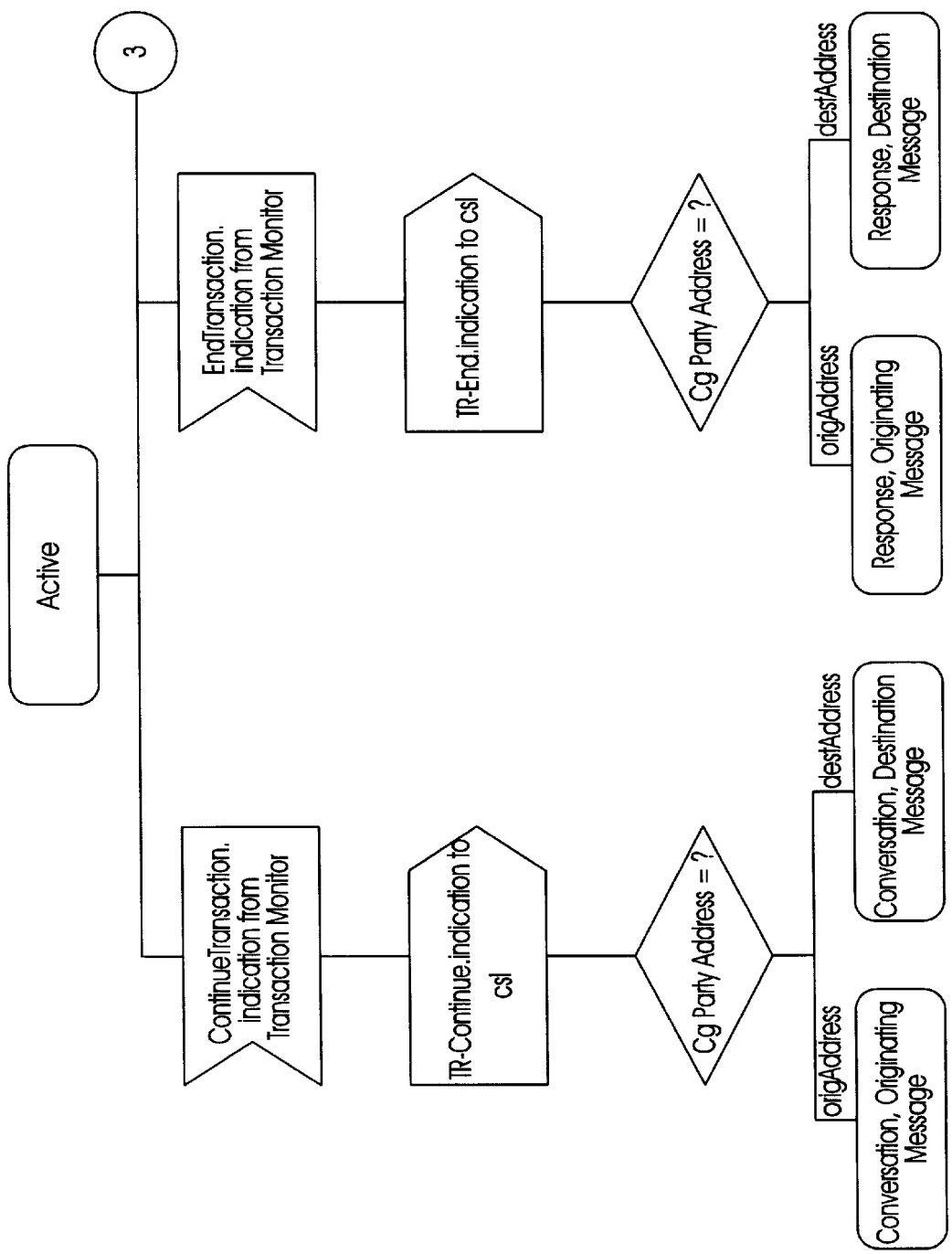
Figure 7C:
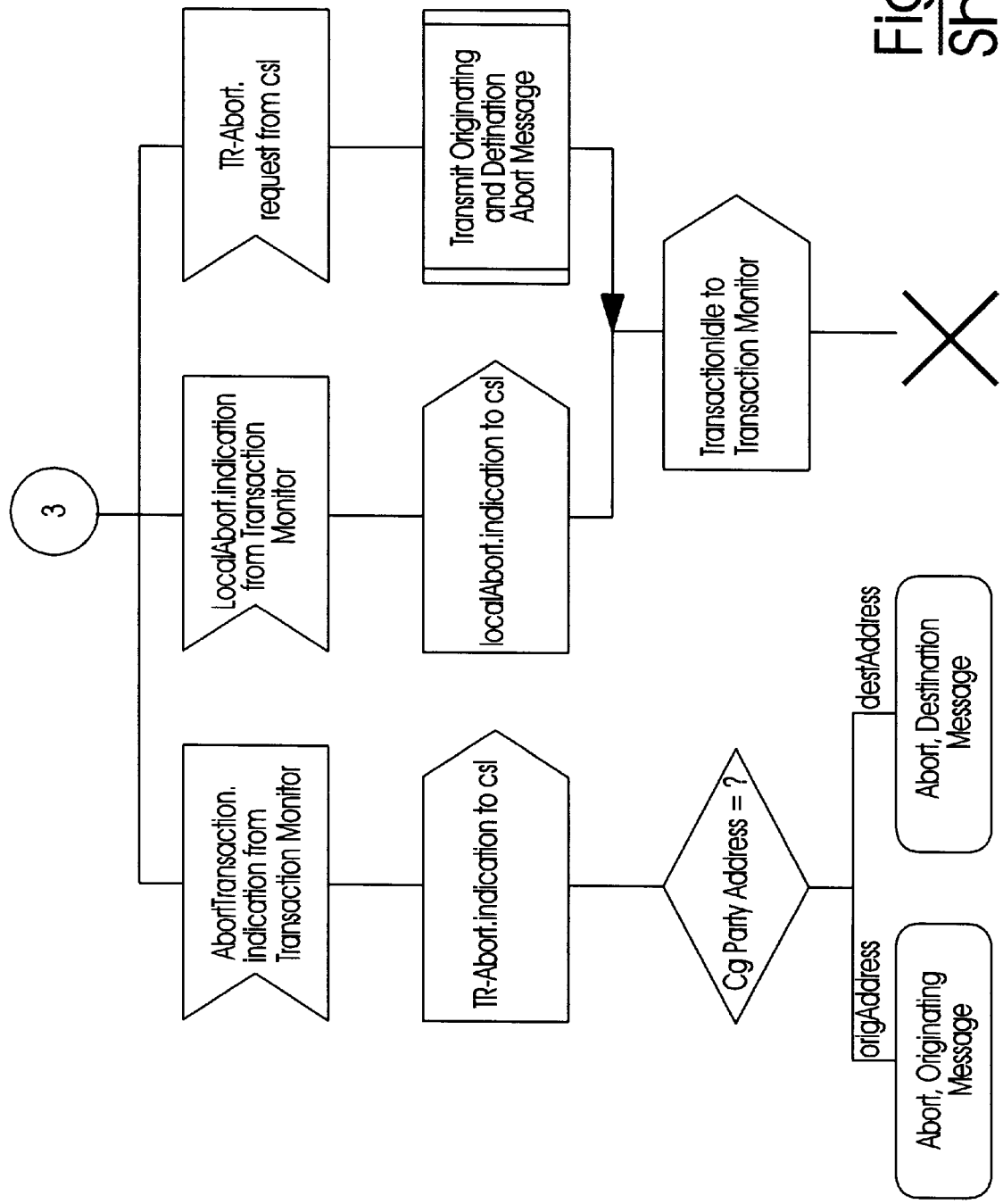
Figure 7C:
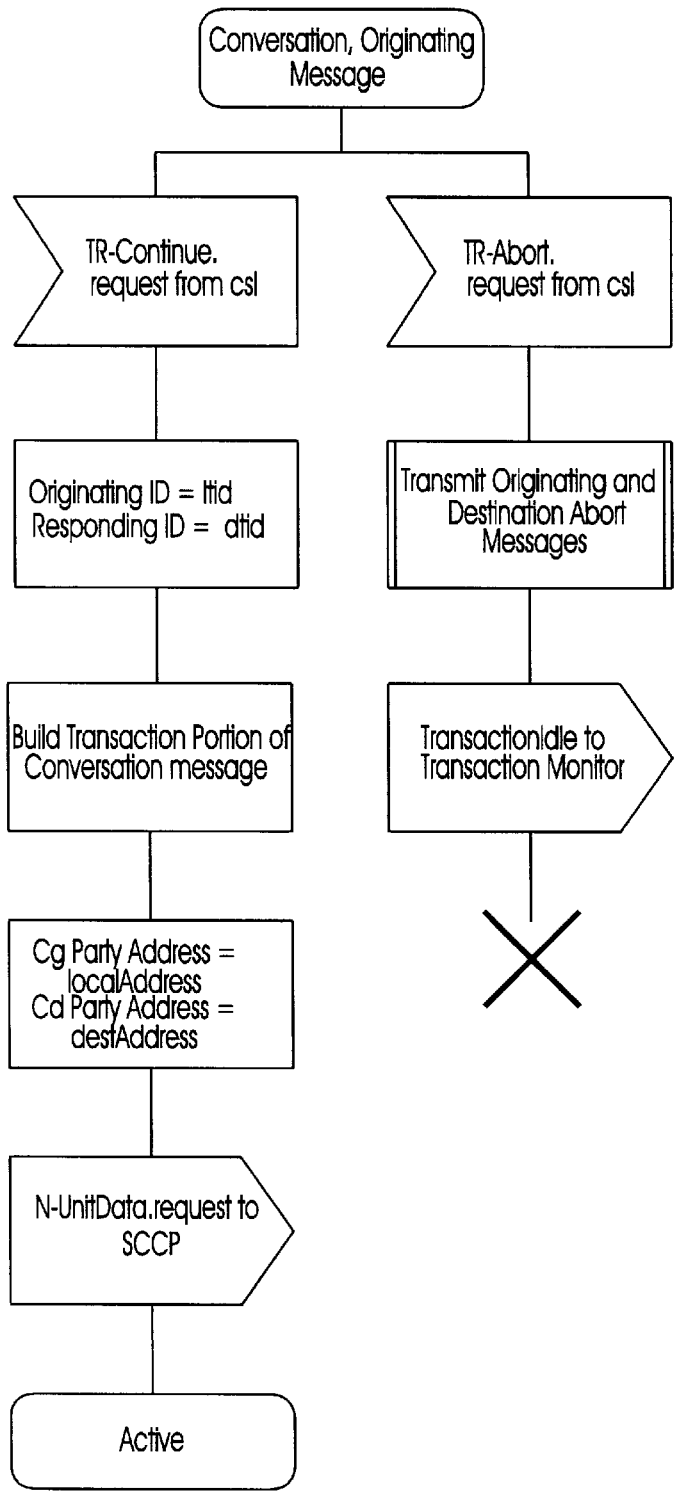
Figure 7C:
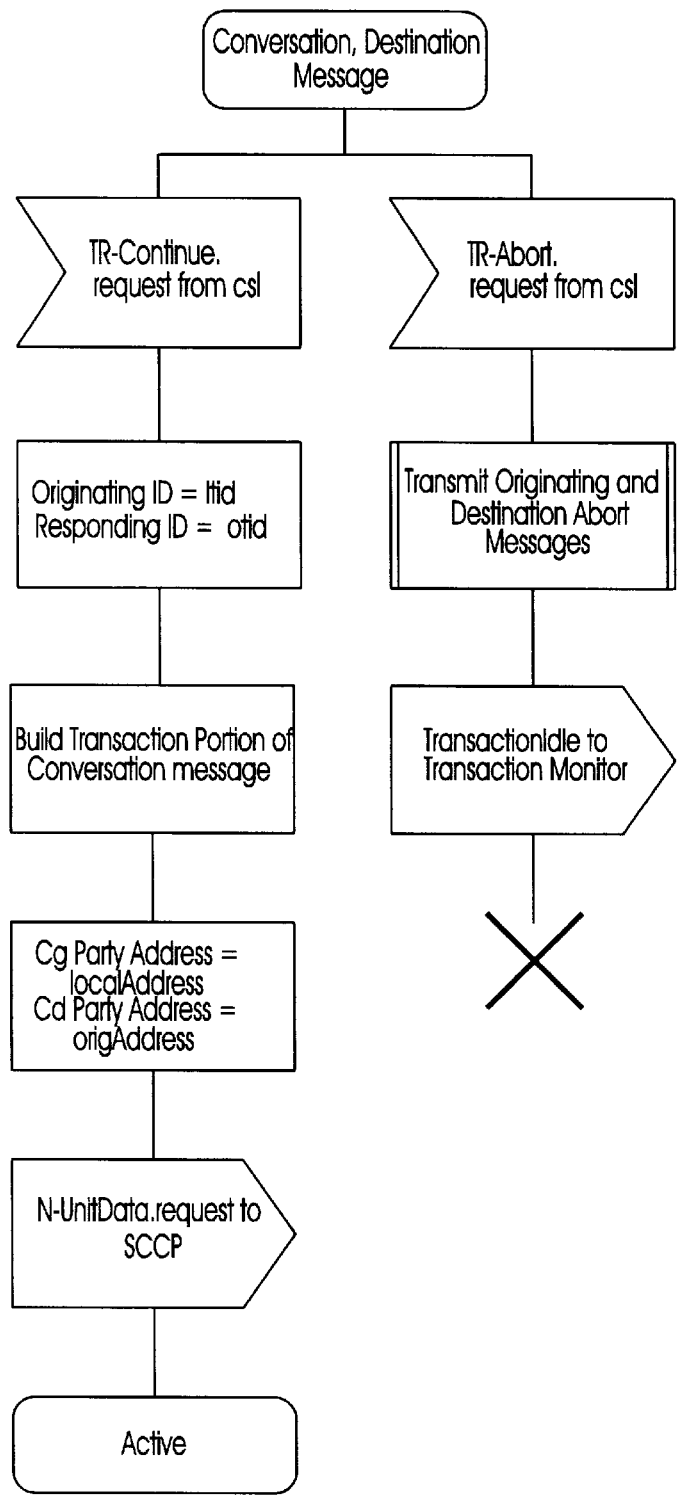
Figure 7C:
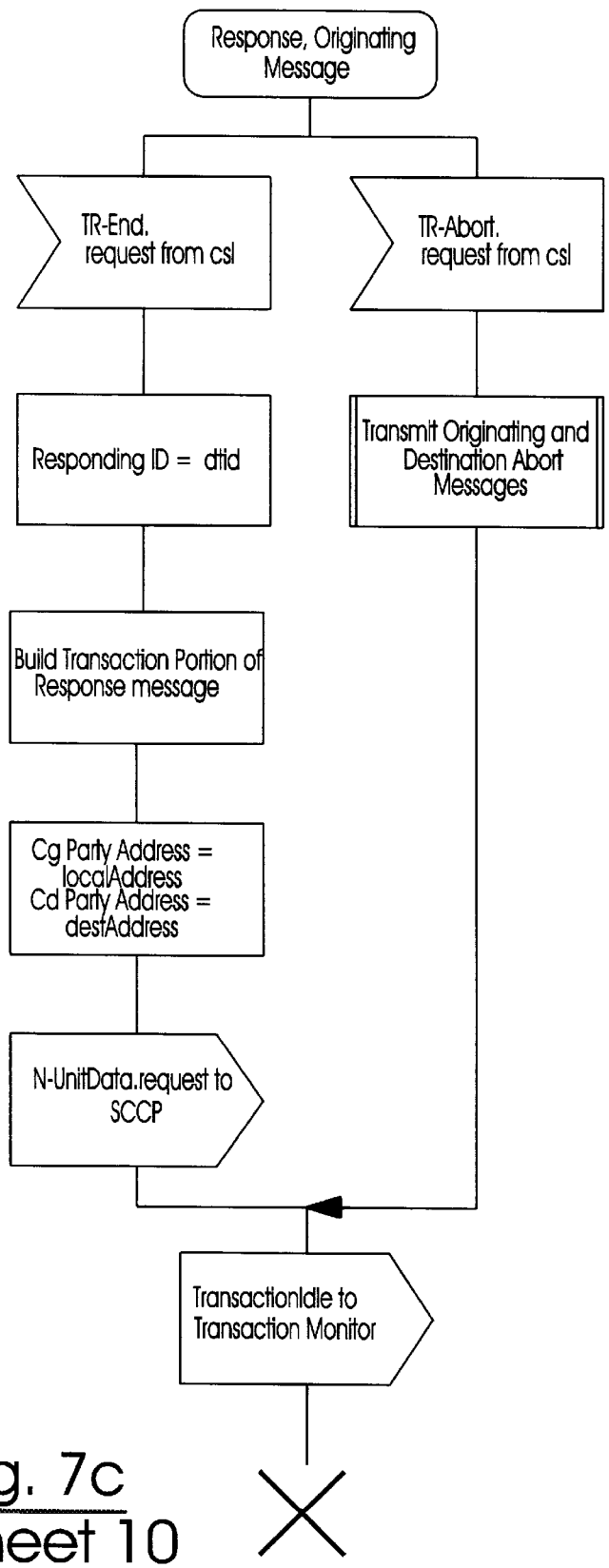
Figure 7C:
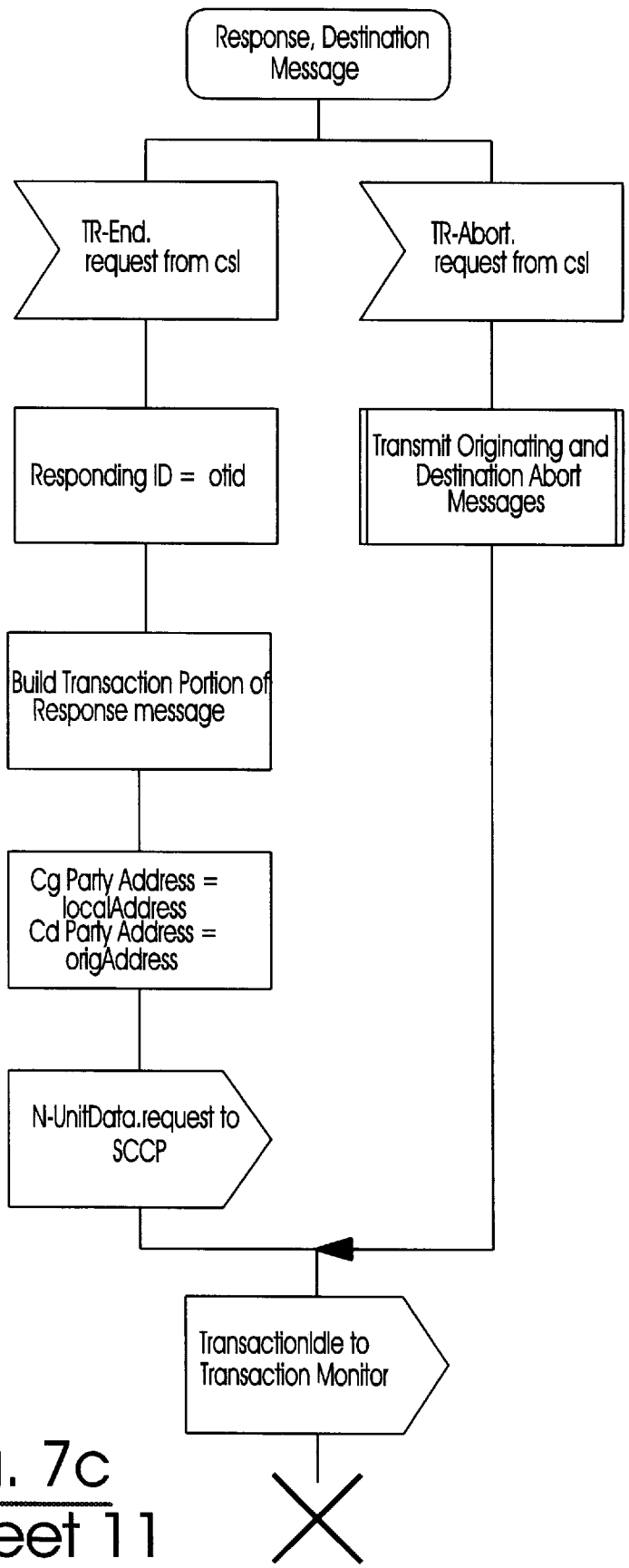
Figure 7C:
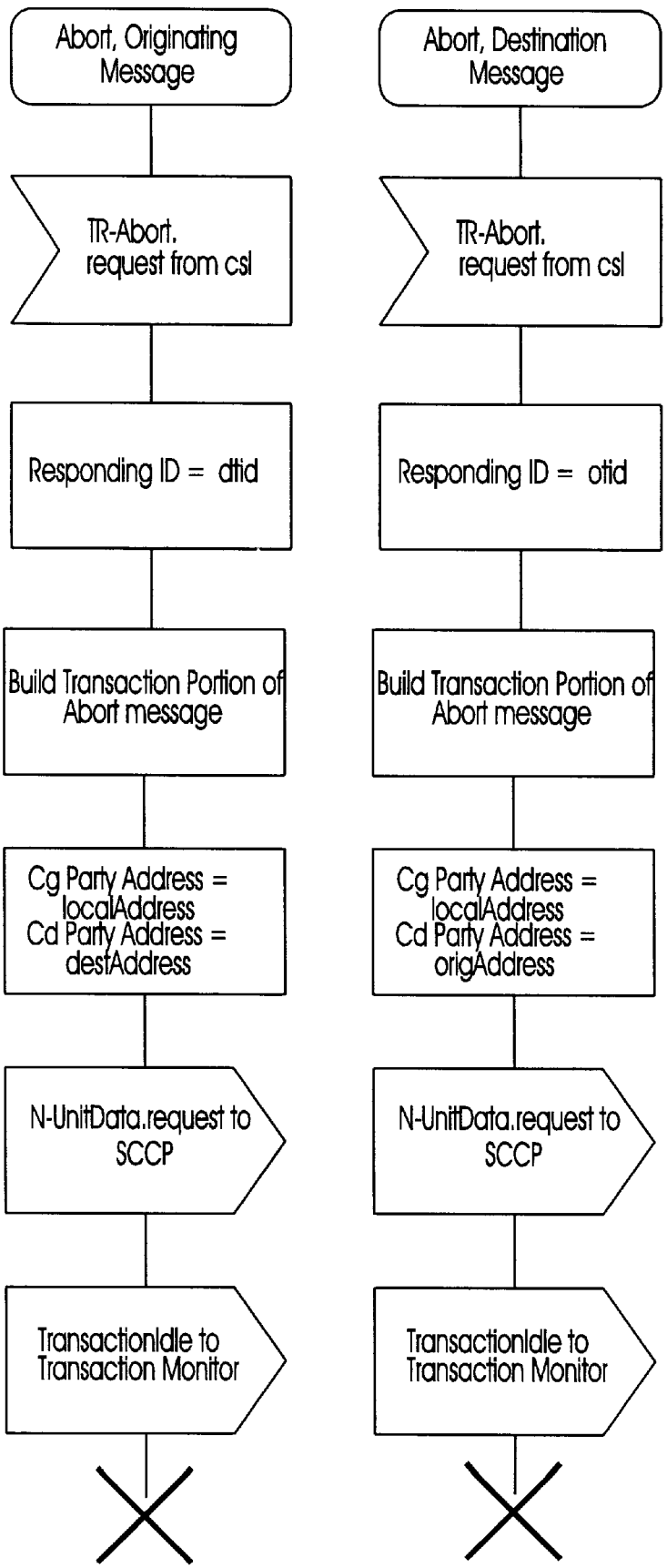

FIGS. 7b and 7c show process diagrams for the TM and TSM processes respectively.

FIG. 7b shows the SDL process graph which is summarized in a textual overview form below for the Transaction Monitor (TM) process. This process receives incoming messages from SCCP, decodes them, validates them for syntactic correctness, and then routes them to the particular Transaction State Machine (TSM) process handling the transaction identified by the message.

I. In FIG. 7b, upon initialization of the SMP, the Transaction Monitor creates 710 an empty map, tm, which it will use to maintain the relationship between transactions and the TSM processes it creates to manage the transactions. The key for this map is a unique TM generated local transaction identifier (symbolized in FIG. 7b as ltid). The associated value is a process identifier for the corresponding TSM process (symbolized as tr). Thus, the pair ltid$_i$, tr$_i$) is entered into tm for each initial query message qm$_i$.

II. After initialization, the TM enters the idle state 711 and awaits an incoming message. When the first message qm$_n$ of a new transaction arrives, the TM creates both a new TSM to handle it and new entry into map tm.

III. For each subsequent message received, the TM determines the TSM handling the transaction in question from tm. The TM then routes the decoded message on to the TSM and returns to the idle state.

IV. During message processing, the TM may, as indicated in FIG. 7b, encounter various error conditions, e.g. a syntactically malformed message or an unassigned transaction identifier value 714. The TM handles these situations by directly generating TCAP Abort messages and using the SCCP N-UnitData.request primitive to transmit them to the appropriate internal or external network SP.

V. Unassociated Messages: The unidirectional message serves the function of transmitting information uncorrelated (at the TCAP level) from any other message. A unidirectional message may be viewed alternately as occurring outside any TCAP transaction or as occurring in a transaction that begins and ends with the processing of the individual unidirectional message. When receiving Unidirectional messages, the TM must first create a TSM to handle the message. Unidirectional messages are processed in a single cycle.

FIG. 7c shows the SDL process graph for the Transaction State Machine (TSM). The TSM maintains information concerning the transaction status, in particular the addresses and transaction identifiers assigned for the transaction. The TSM routes received messages to a Component Sublayer (CSL) process in order to mediate individual components in the messages. After CSL processing, messages return to the TM for reformatting of their transaction portion and transmission to the appropriate (internal/external) network SP.

In a textual overview form, the SDL of FIG. 7c, describes the main function of this process, that being to collect and use address and transaction identifier information for the transaction.

I. There are three address-transaction identifier pairs of interest to the TSM and several local variables record this information as follows:

1. origAddress is the SCCP address of the SP originating the query message for the transaction and otid is the transaction identifier assigned at that SP.

2. destAddress is the SCCP address of the SP that receives the query after it passes through the SMP and dtid is the transaction identifier assigned at that SP.

3. localAddress is the SMP point code and SSN assigned for the TM. The SMP provides this value to the TM and TSM as part of their configuration information. The ltid is the transaction identifier assigned locally by the TM and communicated to the TSM in the TransactionBegin.indication message.

Table 1 summarizes the source and relationships between these variables.

TABLE 1

TSM Address and Transaction Identifier Variables

| Address | Transaction Identifier | Source |
|---|---|---|
| origAddress | otid | SP transmitting Query message to SMP |
| destAddress | dtid | SP receiving Query message from SMP |
| localAddress | ltid | SMP |

II. As shown in FIG. 7c, Sheet 1, the TSM process creates its associated CSL process upon start-up and then enters the Idle state to await the initial message of the transaction from the TM. The first message may be either a Unidirectional message or a Query message (represented by a BeginTransaction.indication message from the TM).Transactions beginning with a query message and which consist of multiple messages, use the variable csl to record the process identifier of the component Sub-layer. The TSM also records the originating address and transaction identifier; passes the message on to the CSL, and enters the Initiation received state.

III. A Unidirectional message will be handled in isolation from any other message. Therefore the TSM simply passes the message on to its CSL process and enters the Unidirectional received state to await completion of mediation activities in the CSL. The CSL responds to the TSM by indicating either that the message should be passed on (Unidirectional.request message) or suppressed (TR-Abort.request message). If the message is to be passed on, the TSM adjusts its address parameters and passes it to the SCCP; otherwise no further processing of the message is needed. The TSM now terminates.

IV. After mediation of the message, the CSL can request that the transaction be ended (TR-End.request message) or aborted (TR-Abort.request message) (Sheet 3). The normal condition however, will be to pass the message on toward the true destination SP (TR-Begin.request message). The TSM adjusts addresses in the mediated message, passes it to the SCCP, and enters the Initiation sent state.

V. In the Initiation sent state (Sheets 4 and 5), the TSM normally expects to receive either a conversation (TransactionContinue.indication) message or a response (EndTransaction.indication) message from the destination SP. In this state, i.e. in advance of identifying a destination point-code-SSN address for the transaction, it is a procedural error to receive a message from the originating SP for the transaction. In case such a message is received, the TSM aborts the transaction. Any subsequent message received concerning the transaction will be dealt with by the TM. The TSM may also receive various error indications while in this state. On receipt of any of these messages, the TSM informs the CSL that the transaction is ending and then terminates.

When the TSM receives the Conversation or Response message, it records the destination address and transaction identifier for the transaction, passes the message to the CSL and enters either the Conversation, destination message state or the Response, destination message state, depending on the type of message received.

VI. After the initial exchange of messages the TSM has the =necessary address and transaction identifier information needed to continue the transaction (Sheet 6). The TSM awaits the arrival of further messages for the transaction in the Active state. TCAP procedures allow either a conversation, response, or abort message to be sent at this time. These messages may be transmitted by either the originating or destination SP. The TSM represents the combination of message type and message source through the 6 processing states listed in Table 2. On receipt of a message, the TSM passes the message to the CSL and then enters the state corresponding to the message type and source and awaits a response from the CSL.

TABLE 2

TSM Active Transaction Processing States

| Message Type | Message Source | TSM State |
|---|---|---|
| Conversation | Originating SP | Conversation, originating message |
| Conversation | Destination SP | Conversation, destination message |
| Response | Originating SP | Response, originating message |
| Response | Destination SP | Response, destination message |
| Abort | Originating SP | Abort, originating message |
| Abort | Destination SP | Abort, destination message |

VII. After mediation of the message in the CSL, the subsequent action will be to pass the message on (perhaps with some alterations made by the CSL) or to abort the transaction. These actions, consisting of adjustments to transaction identifiers and addresses for the message, are shown on Sheets 8–12 of FIG. 7c. If the message received was a conversation message, the association is continuing and the transaction returns to the Active state. Response or abort messages end the association and therefore the TSM terminates after passing these messages on.

VIII. In addition to "normal" message processing in the TSM, a number of error conditions can occur, indicated by the receipt of various types of abort messages by the TSM while in its Active state. In these cases, the TSM relays the abort message on toward the CSL and to SP's outside the SMP where appropriate.

Figure 7D:
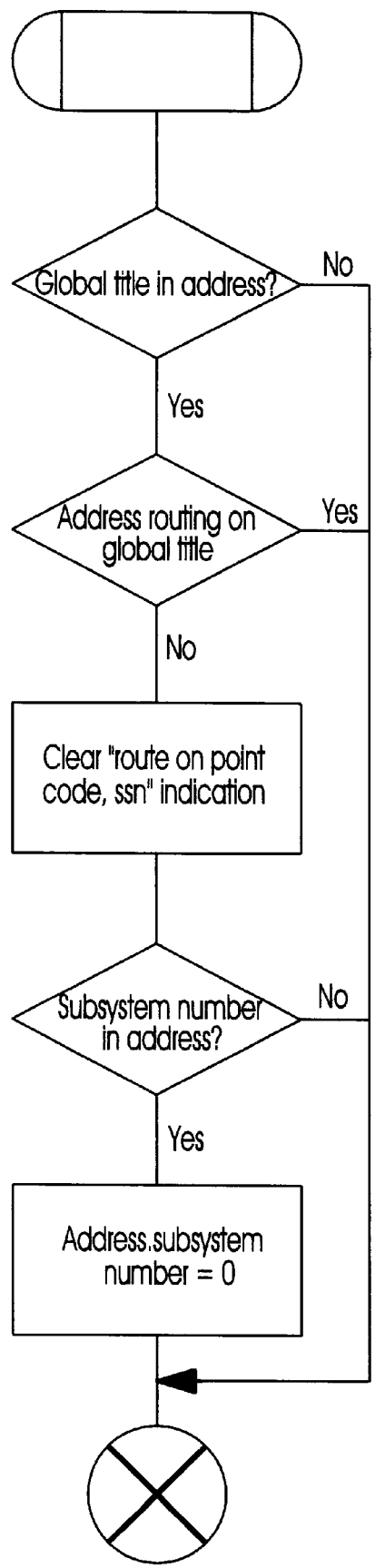
FIGS. 7d and 7e are subordinate SDL procedure graphs used by the Transaction State Machine in FIG. 7c.
Figure 7E:
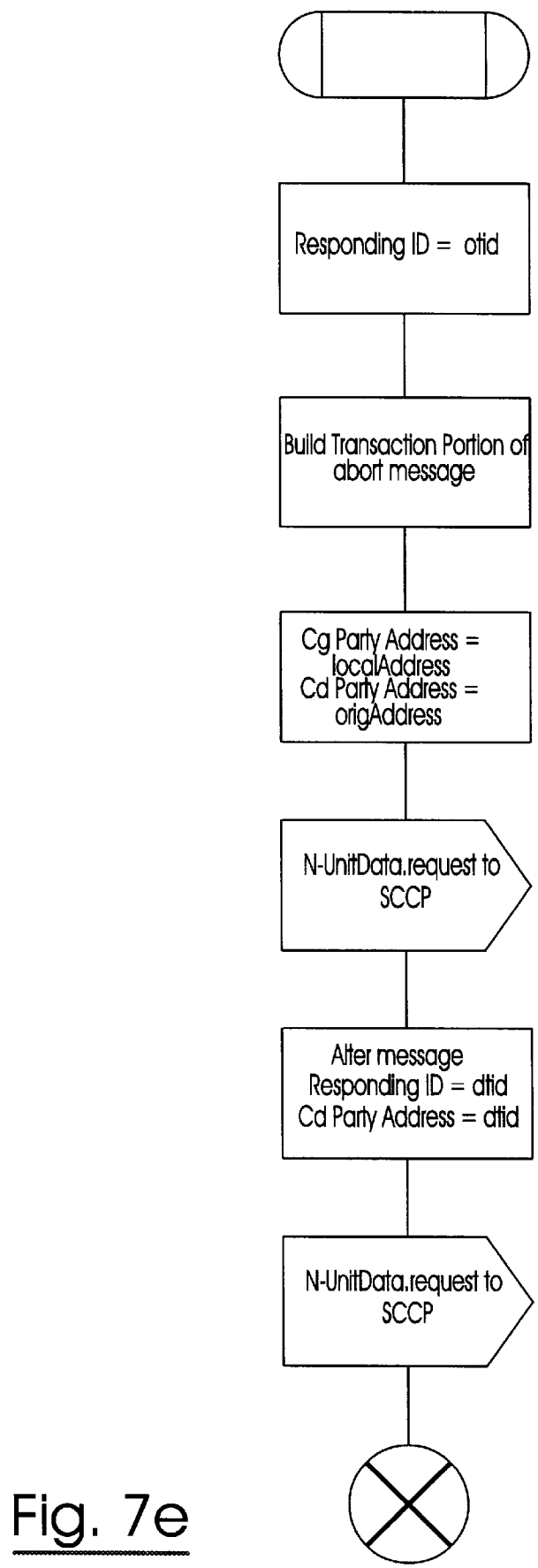

In addition to FIG. 7c, the main flow diagram of the TSM, FIGS. 7d and 7e show two subordinate SDL procedures used by the TSM.

FIG. 7d is the procedure used by the TSM to adjust the Called Party Address (CdPA) parameter of a received query or unidirectional message prior to retransmitting the message toward its destination SP. This readjustment reflects the fact that where the SCCP CdPA contained a global title address, the address will have undergone a final global title translation during routing of the message to the SMP mediation sub-system. The SMP now resets the address indicators so that the message again routes on global title toward the destination SP.

FIG. 7e is a procedure used by the SMP when it must abort an active transaction due to request from the CSL. In this case the SMP must send an abort message to both originating and destination SP's for the transaction. The procedure of FIG. 7e shows the construction of these message with appropriate transaction identifiers and address parameter values and their transmission through the SCCP N-UnitData.request service.

The above-described procedure for associating TCAP transactions within an SMP is also applicable to other CO-network protocols in which connections may be coupled within the SMP.

In manipulating the CdPA of a received SCCP message containing the initial (Unidirectional or Query) message of a transaction, a preferred embodiment of the SMP operating in the network configuration of FIG. 3 must observe certain specific requirements for the placement and associated GTT functions that form part of the claims of this invention.

Specifically, initial messages routing on global title addresses toward the SMP, whether from an internal or external SP, should undergo a final GTT before they reach the SMP. They will therefore, reach the SMP addressed to the SMP point code and an appropriate mediation subsystem within the SMP. After mediation, the SMP will, according to the procedure of FIG. 7d alter the CdPA to route on global title again and pass the message to SCCP functions within the SMP. The SCCP function will then use its own SCCP global title address translation information to choose the next destination SP for the message and route the message toward that point using existing art.

Initial messages routing on point-code-SSN addresses must be addressed to a VSP associated with the SMP. Consequently, the SMP will derive a new destination point code for the message using the procedure documented in FIG. 5a. Although this is not shown explicitly in FIGS. 6 and 7, the VSP point code is carried through the message flows in these figures and enables the SMP to transmit a properly formatted message on toward the new destination SP after mediation.

The novel procedures described to this point in this preferred embodiment of the invention, addresses the routing of traffic through an SEP-like SMP using either a VSP procedure to route traffic at the MTP level, or association data derived from SCCP/TCAP messaging. The SCCP/TCAP procedures also enable the SMP to maintain a context, the transaction, for associating otherwise separate messages passing through mediation function. To complete the discussion of basic procedures, corresponding procedures for associating separate ISUP messages are required.

ISUP CALL ASSOCIATION PROCEDURES

The basic mechanism for associating separate ISUP messages in the SMP is related to the concept of a call or connection between users of the interconnecting telecommunications networks. According to the existing art of ANSI T1.113, certain ISUP messages (e.g. an Address Complete Message) cause state changes of a basic call on an ISUP-controlled interoffice circuit while other messages do not (e.g. a Facility message). Therefore, by monitoring the messages types sent and their sequence, the SMP can determine which messages should be associated with one another in the context of a basic call.

In addition to call associated messages, some ISUP messages are transmitted outside the context of a call and perform special functions, such as blocking or unblocking the interoffice trunks used in connecting calls. Although these messages may be viewed as outside of any call, it may, depending on the mediation requirements for an interface, be useful to treat them as establishing special call associations between the SPs concerned. For example, if interoffice trunk blocking is permitted at an interface, receipt of a circuit blocking message may be treated as establishing a special "blocking" call over the circuit. Until receipt of a corresponding unblocking message, this special message provides a context within the SMP for recording the call state. In any case, the interpretation of these ISUP messages and their association with other messages concerning the same interoffice circuits depend upon the existing art semantics of the messages, as specified in ANSI T1.113.

Although the message semantics and the associations implicit between messages are established by the existing art, the SMP must nevertheless employ novel procedures since the interoffice circuits controlled do not terminate at the SMP as they do in the case of a normal SSP. For this reason the SMP must implement procedures for handling and associating these message that differ from normal SSP procedures as follows:

I. A received ISUP message contains an originating Point Code, opc, a Destination (VSP) Point Code and a Circuit Identification Code, cic. Since ISUP messages use the VSP procedures previously noted, the Destination Point Code will be a VSP point code, symbolized here as vpc. The SMP uses the point code pair (opc, vpc) as the key to determine a corresponding call destination SP point code, dpc, from the signalling relation map $C\mathcal{R}$ according to the VSP procedures previously noted.

II. The SMP uses the triple parameter set (opc, dpc, cic) as the key to search its call map $Cm$, for a record related to this call. It is the use of point codes not associated with the SMP itself, i.e. opc and dpc, for managing call/association information that constitute a novel method in this invention required for mediating ISUP messages.

III. The SMP next examines the message type to determine if it represents the start of a new call, continuation of an existing call, or is outside the context of a call, according to the existing art of T1.113. The message class, considered together with the existence (or not) of a call record, gives rise to the following cases:

A. If the message represents the start of a new call and there is no existing call record, the SMP creates a new call record c, and enters the record into its call map $Cm$ with ($opc_i$, $dpc_i$, $cic_i$) as its key.

B. If the message represents the start of a new call and there is an existing record for the call, this is an instance of "glare". The SMP applies the ISUP procedure for glare resolution to determine whether it will continue the call represented by the current message or the call already recorded in the call map.

1. If the call represented by the current message is to continue, the SMP replaces information recorded in the call record $c_i$ with new information taken from the current message and continues processing the current message.

2. If the previously recorded call is to continue, the SMP discards the current message. No further processing occurs.

C. If the message represents the continuation of an existing call, the call record exists and normal mediation processing continues. If on the other hand there is no record of the call, this represents a procedural error to be resolved according to existing ISUP procedures for handling improperly sequenced messages.

D. If the message is outside of the context of any call (unassociated ISUP messages as discussed earlier), the SMP will use any record found in mediating the message as some of these messages (e.g. circuit blocking) can change the status of existing calls.

IV. The SMP performs any other mediation functions required for the message.

V. The SMP now returns the mediated message to its MTP functions using the VSP-Transfer.request primitive. As previously noted, this causes the MTP to manipulate the message point code fields so that the message routes onward toward the appropriate SSP.

STP-Like SMP

Figure 8:
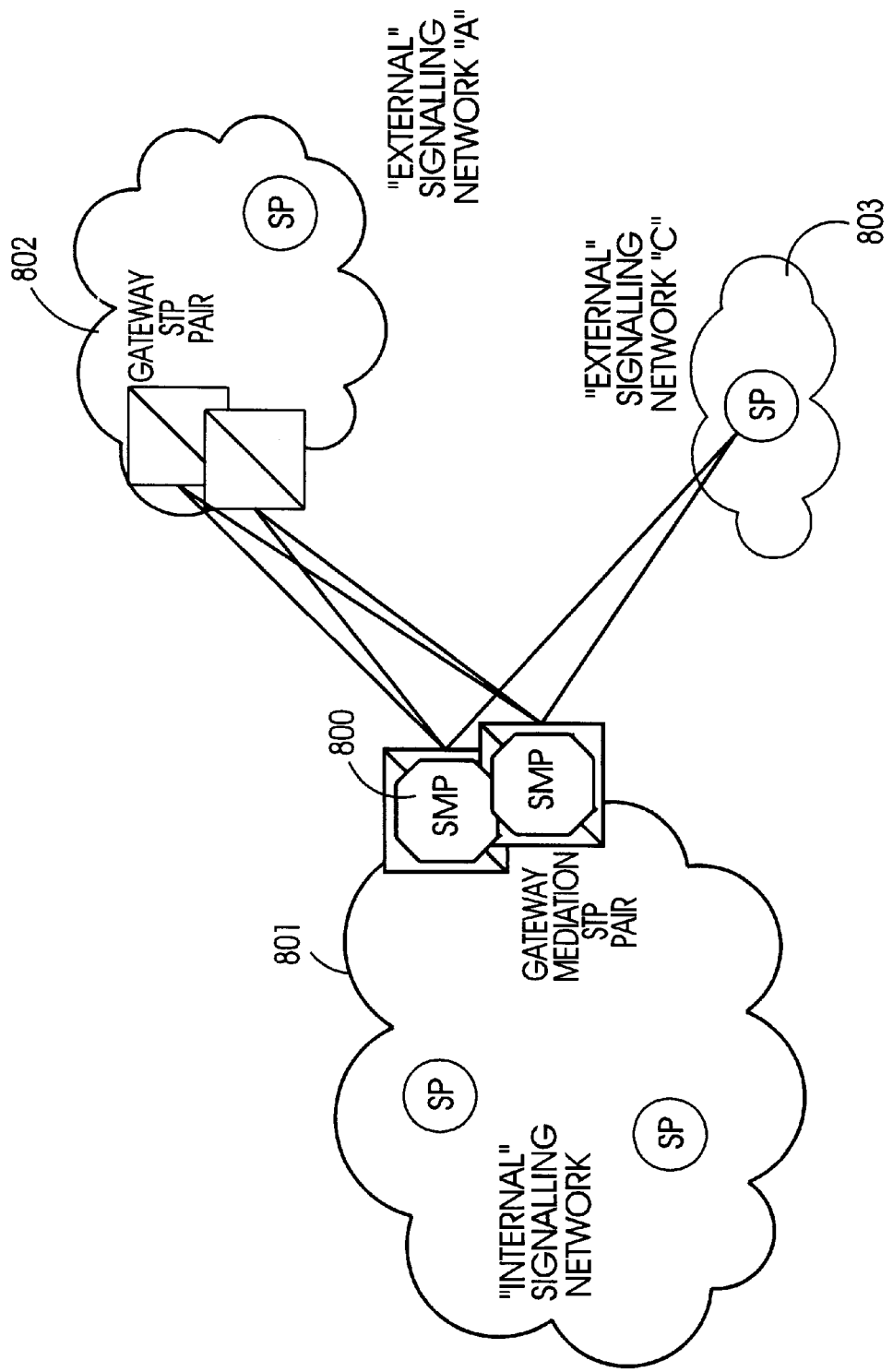
FIG. 8 is a diagram illustrating the placement of a mated pair of SMPs at the internal network's boundary. The SMPs have message transfer capabilities and therefore, concurrently act as Gateway Signal Transfer Points (STPs)

In the embodiment of FIG. 8, SMPs 800 have MTP message transfer capability. This changes the requirements for addressing traffic passing through an SMP between the internal network 801 and external SPs of networks 802 and 803.

When the SMP has MTP message transfer capability, it can receive and reroute messages addressed to other SPs at the MTP level. This can simplify SMP message routing since the internal and external network SPs that originate the messages will now assign end-to-end addresses to them. Consequently the SMP does not require the procedures claimed for the SEP-Like SMP identified earlier to determine new destination addresses for the messages that it receives.

The availability of the MTP messages transfer capability however, may render the SMP more permeable to unintended traffic that might now route through the SMP without ever undergoing mediation. Accordingly, the present invention introduces a novel procedure, an extension of the existing Bellcore defined gateway screening process, to select messages for mediation in order to ensure that no message can bypass the intended mediation functions.

Bellcore's gateway screening procedure, described in Appendix C of Bellcore GR-82-CORE, is a simple pass/fail filter applied to incoming MSUs at an STP. Here, an STP discards any MSU failing the filter process; MSUs that pass filtering receive normal MTP and SCCP processing from the STP.

The novel extension to the gateway screening process for the STP-like SMP is the provision of an additional pointer type, to be identified as "SSN Route" in the gateway screening tables. This is in addition to the current pointer types that control the flow of the screening process between gateway screening tables and the "Stop", "Fail", and "Ignore"pointers that identify gateway screening outcomes. The SSN Route pointer indicates the number of a local (SCCP) sub-system in the SMP to which the screened message shall be delivered for mediation.

The internal content of the sub-system and subsequent handling of the message by the SMP depends on the message's protocol part. The following paragraphs discuss protocol part specific message handling procedures and sub-system structure.

The STP procedures for handling MTP management messages differ significantly from those applicable in an SEP. Specifically, an STP must initiate certain MTP management procedures that are not applicable to SEPs, in reaction to failure of links or link sets. Of greater concern in network interconnection is the possibility that an SMP will receive management messages for relay that are of little use to the internal network (or could in fact, flood the internal network with valueless signalling traffic, potentially compromising the internal network's operational reliability) due to procedures implemented in the interconnecting external networks.

This may make it desirable to monitor and mediate all MTP management messages received on STP-like SMP links to ensure that information concerning internal network SPs is not propagated into external networks unless necessary. Similarly, the SMP should not propagate network management information concerning external networks/SPs into the internal network, unless this information is required by internal SPs that communicate with these external SPs.

Therefore a sub-system designed for receiving and processing MTP management messages will implement the (existing art) procedures referenced in FIG. 4 of MTP Signalling Network Management 402, MTP Signalling Network Testing and Maintenance 403, or both as required by the arrangements to be tracked and enforced by the SMP. To these MTP functions are to be added the specific mediation application functions of the SMP.

The ability of an STP-like SMP to relay SCCP/TCAP traffic addressed to other SPs makes it possible to avoid the use of the SCCP/TCAP procedures described for the SEP-like SMP earlier. Instead, the internal and external network SP's participating in a transaction could manage addresses and transaction IDs exactly as they would in the absence of an SMP. The SMP could then simply intercept these messages as it relays them between the internal network and external network's SPs. In doing so however, issues relating to cross-SMP performance and real-time message association tracking would remain outstanding. Therefore, the present invention introduces procedures for STP-like SMPs which allow for selective application of the Global Title Addressing procedures to transactions relayed through the SMP that require either detailed mediation of all messages pertaining to the transaction, or real-time tracking of the overall association data, or both requirements.

The present invention defines a simple algorithm for selecting messages for detailed mediation, specifically that the messages of interest must be addressed to the SMP itself. Other messages received at the SMP may still be addressed to external or internal network SP's. The SMP will simply relay these messages using existing, efficient SS7 procedures to identify the message route selection required. Minimizing the number of messages requiring detailed mediation will improve the efficiency of the SMP, minimize processing power requirements and improve the overall cross-SMP performance characteristics.

As noted in FIG. 8, STP-like SMPs 800 are implemented in a mated pair configuration across a specific interface in order to ensure a highly available gateway. SS7 MTP message routing procedures do not guarantee that messages sent from the internal network to the external network will follow the same path as those sent from the external network to the internal network. Further, although SS7 ensures that messages sent in one direction for one transaction all follow the same route, this routing can be altered in the event that one of the signalling links along the route fails during the course of the transaction, nor do messages sent in the reverse direction have to follow the exact reverse route (i.e. they may route through the other member of a mated STP pair). These considerations could compromise the ability of an SMP to provide reliable real-time message association tracking. Requiring SCCP/TCAP messages to be addressed to the SMP will effectively address the concern of tracking of all messages associated with a single transaction.

Based on these considerations a preferred embodiment of the invention in an STP-like SMP uses gateway screening procedures to distinguish between classes of messages requiring more detailed mediation and those that can be routed without screening other than that provided by the gateway screening procedure itself. The messages requiring detailed mediation route to an SMP sub-system containing TCAP and mediation application functions described in FIG. 7. Other messages use the existing MTP and SCCP function for further routing.

The situation for ISUP message handling in an SMP which has message transfer capability is analogous in some respects to the situation for SCCP/TCAP messages described earlier. Although it is possible to relay such messages through the SMP while using end-to-end addressing on the messages, there is still a benefit in using the ISUP call association procedure specified earlier for the SEP-like SMP, when the SMP must track associations in real-time or when co-ordinating both forward and backward signalling paths for a call.

A key difference however, is that it is not possible to use the ISUP call association procedure selectively since the DPC used by a SP (Central Office switch) to communicate with the correspondent switch for a given interoffice circuit, is a fixed part of the circuit configuration and cannot vary on a call-by-call basis. Therefore, it is necessary to determine in advance whether call routing between a given internal and external Central Office pair will require association tracking or not. If so, the Central Offices should be configured to use the SMP's call association procedures for all calls. Otherwise, the CO pair can simply relay their traffic through the SMP, using the usual MTP addressing employed by ISUP.

The routing and mediation procedures associated with a VSP have previously been described. Alternately, when using gateway screening procedure to select ISUP messages for mediation, the SMP routes the selected messages to a sub-system containing an implementation of ISUP message encoding and decoding functions (according to the existing art of ANSI T1.113). This sub-system will also contain the mediation functions required for these messages and, after mediation, returns the message to MTP functions of the SMP for routing on to the SP addressed by the message's destination point code field.

SEP-Like SMP Internally Located

Figure 9:
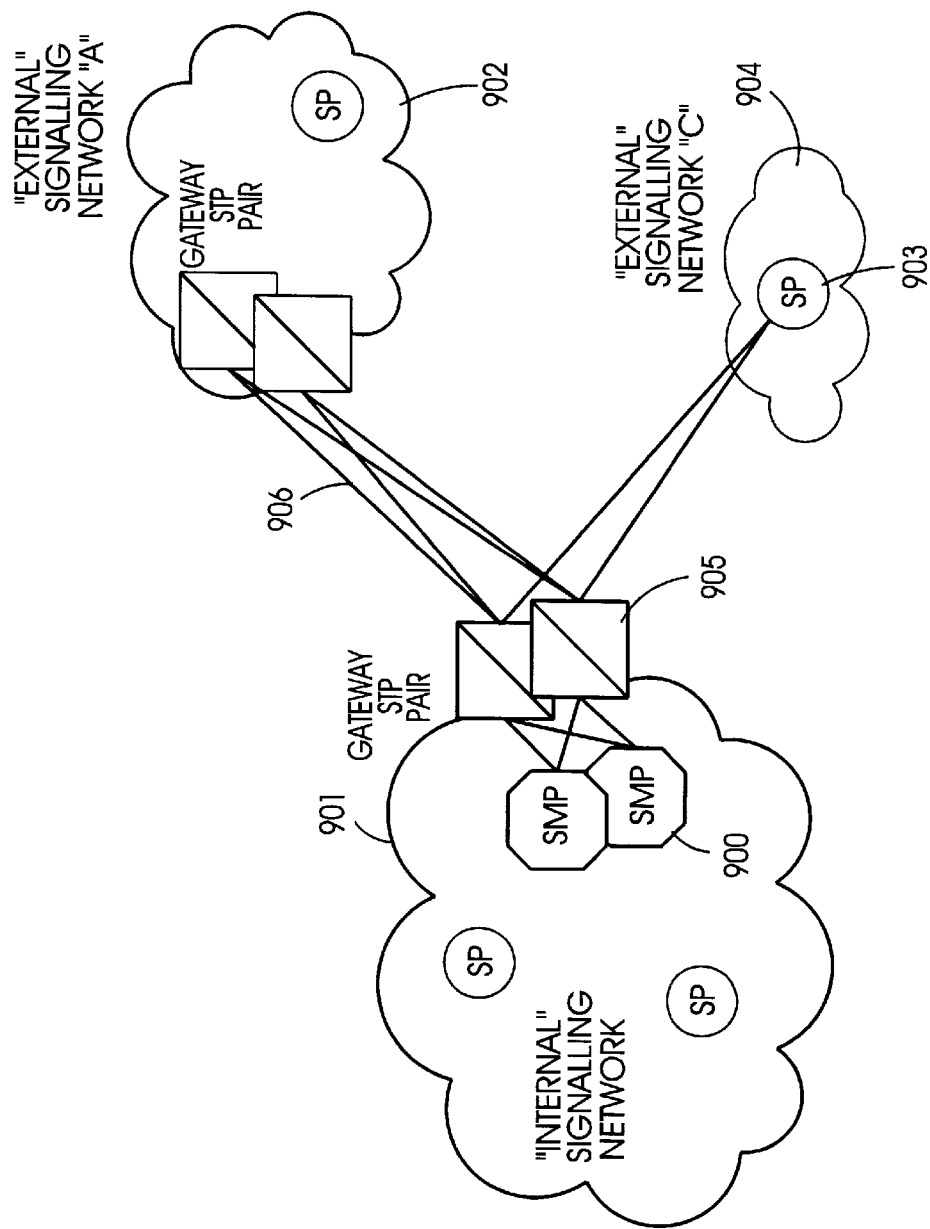
FIG. 9 is a diagram illustrating SMPs attached to a mated pair of Gateway STPs according to another embodiment of the present invention.

FIG. 9 shows yet another configuration addressed by the system and method of the present invention. In this configuration, rather than positioning the SMP pair 900 at the network boundary, it is attached to a mated pair of gateway STPs 905. An external network 902 or SP 903 of network 904 requiring interconnection with the internal network 901 connects via signalling links 906 and 907 terminating on the Gateway STPs 905. The Gateway STPs 905 must ensure that traffic directed across the network boundary reaches an SMP 900 by using the gateway screening procedures of GR-82-CORE to screen incoming messages. Once the messages have been routed to the SMP, the SMP uses the same procedures as an SMP without message transfer capabilities placed at the internal network boundary (as described for FIG. 3) to process the messages.

Messages originating at internal SPs demand appropriate configuration of the SP and of any STPs performing global title translations in order to ensure that the messages route to the SMP 900 rather than directly through the network gateway. Again the SMP uses the previously described procedures of an SEP-like SMP to process and mediate these messages.

SMP Mediation Architecture

It is not possible at the present time to reduce SMP functionality to a simple collection of table driven functions that can be provisioned through traditional telephone operational methods. While some SMP functions are well understood and can be configured using these methods, other functions are less well understood and will require more complex provisioning capabilities. Consequently, the SMP must be capable of responding to newly identified threats within very short intervals through the introduction of incremental mediating functionality to the SMP without destabilizing its existing functionality.

These requirements demand that the mediation architecture of the SMP be highly flexible so that the SMP operator can easily add new functional elements (mediators) without disruption of the existing elements. The SMP operator must then be able to "connect" these new mediation functional elements to the existing message classification procedures in order to apply them to selected traffic classes.

Any MSU reaching a SMP is subject to message classification. Message classification determines whether the MSU will be subject to mediation functions or will simply route toward its destination using the existing SS7 protocol procedures. If the MSU is subject to mediation, message classification also determines which mediation functions will apply to the message.

The methods used for message classification significantly affect SMP processing requirements and cost since they must be applied to every message received by the SMP. Mediation devices therefore, require relatively fast, yet flexible algorithms in order to separate traffic that requires no mediation or minimal mediation from that which requires more extensive analysis.

Message classification functions are, for the most part performed implicitly as part of the lower layer protocol functions for message handling already described. The higher (mediation application) layer classification functions are configured as part of the embodiment of actual mediation functions in the SMP which are described schematically in FIG. 10 and in detail in the following paragraphs.

Figure 10:
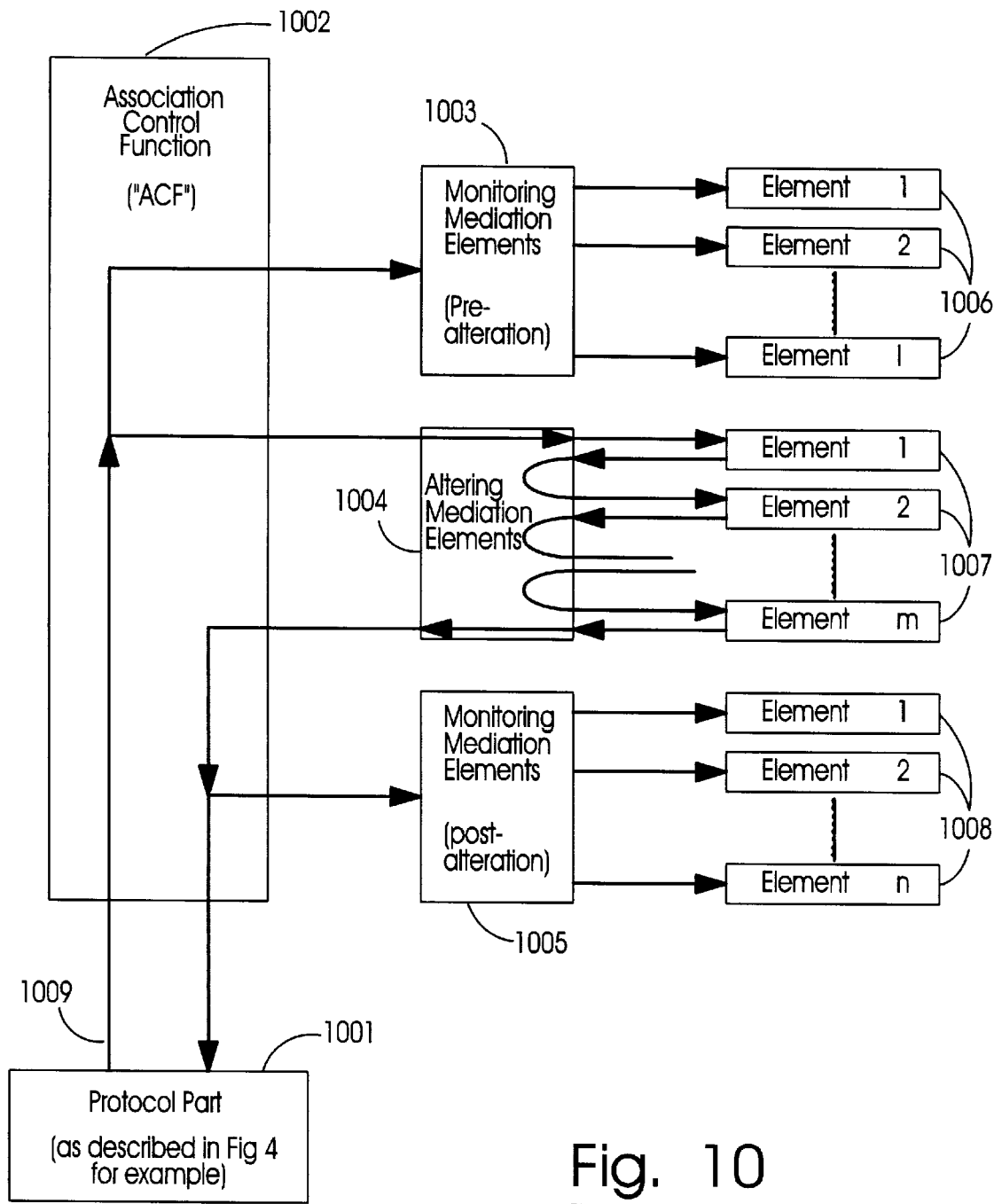
FIG. 10 shows relationships between the protocol handling parts of the SMP and its mediation functional elements.

When the SMP first receives a message, protocol specific functions classify and process the message through procedures such as VSP manipulation and transaction (or association) tracking previously described and shown in FIGS. 4–7. FIG. 10 summarises these functions as the protocol part 1001. Although block 1001 is described as an SS7 protocol function, it is equivalently applicable to non-SS7 protocols. An example of a protocol part is the Component Sublayer 703 shown in FIG. 7a. Another example of such a function is the ISUP call control process managing an individual call. The protocol part decodes received messages into components; each component has a type and some associated parameters.

In the case of TCAP messages, the components are TCAP components. The component type is a combination of the component type (invoke, return result, return error, or reject) and the code specified in the operation code field of the invoke component of the operation. The parameters are the elements of the parameter set or sequence carried by the TCAP component.

In the case of ISUP, each message corresponds to a separate component; the message type is the component type and the message parameters are the parameters.

The protocol part passes the components, together with their parameters to an association co-ordination function 1002. The purpose of the association co-ordination function is to route the incoming messages to mediation elements. Mediation elements are classified as members of mediation group 1003, 1004, and 1005 depending on their potential for modifying received components 1007 and whether a given element will monitor a component as it is received by the SMP 1006 or after possible modification of the component by other mediation elements 1008. A received component passes from the protocol part to the Association Control Function (ACF), through individual mediation elements and then returns to the protocol part for transmission in a definite and deterministic manner implied by the paths 1009 shown in FIG. 10.

Each mediation element performs an individual mediation function required by the SMP. Since the present invention is concerned with the structure for handling mediated SS7 messages in an SMP rather than with specific mediation functions, individual functions have not been enumerated as part of this invention. An example of such a element, applicable to mediating_IN (Intelligent Network) traffic, would however, be a mediation element that compares the operation codes of received components against a list of operation codes acceptable by the internal network within a given business arrangement and rejects any components that do not have a recognised operation code.

For the purposes of this invention, mediation elements can be considered as separate plug-in parts that can be added or removed to the mediation structure within the SMP as required to meet the changing mediation requirements of the internal network. Although individual mediation elements have distinct functions, they are treated within the structure of the SMP as interchangeable parts that are added to and subtracted from SMP sub-systems at will. This flexibility facilitates a very quick response by the SMP to newly perceived or newly detected threats stated as a requirement above.

The final element of the present invention to be considered is the structural considerations for message handling and the capabilities for SMP configuration provided by a preferred embodiment of the ACF 1002.

It is in fact, the ACF that provides the basis for configuration of mediation functions in the SMP. When the operator of the SMP identifies requirements for mediating a new class of traffic, the operator will configure a new mediation sub-system for this traffic. The following steps describe both the process of configuration and the implications that the configuration will have for the processing of a received component as it passes along the path 1009.

I. The sub-system, consisting (initially) of just the ACF is added to (configured within) the SMP. (Note that at this point and throughout the steps that follow the sub-system, although in existence, is dormant so that it has no impact on existing live traffic flows in the SMP).

Depending on the type of traffic to be mediated, the operator configures a corresponding protocol part.

The possible protocol parts, shown on FIG. 4, include:

A. MTP management functions, Signalling Network Management 402 or Signalling Network Testing and Maintenance 403, as shown on FIG. 4. These functions are part of the existing art of ANSI T1.111.

B. SCCP 404 (and also FIG. 6). The use of SCCP also implies the configuration of the TCAP functions shown in FIGS. 7a–c.

C. ISUP 405. ISUP call control processes have been described previously in connection with association tracking and form part of the existing art of ANSI T1.113.

II. The configuration of individual protocol parts is protocol-part-specific but in general includes establishing parameter values both for features that are part of the existing art (e.g. SCCP Translation Types and Sub-System Numbers) and for features that are part of the current invention (e.g. table entries in the VSP map $R$ used for routing VSP-addressed messages through the SMP).

III. The operator now selects specific mediation elements from among those existing within the SMP and connects them to the ACF. In general, two classes of mediation functionalities can be distinguished: those which monitor but do not alter the mediated components (grouped in 1003 and 1005) and those which may alter a mediated component, discard it, or generate additional components (grouped into 1004).

IV. Mediation elements which may alter components, discard them, or add new components are grouped into a single class 1004 to facilitate sequencing components through the individual mediation elements in this class 1007. ACF configuration parameters provide a sequence for each such mediation element 1007 so that a received component is processed by the first mediation element in the sequence, then the second, and so on until all such mediation elements have processed (and possibly altered) the component. If any of the mediation elements in the sequence determine that the component should be discarded, subsequent elements do not receive the component. Similarly, any alterations made in the component are visible to subsequent mediation elements in the sequence. The sequencing function of the ACF ensures that any component modification made are deterministic and under control of the SMP operator.

V. When one of the altering mediation elements 1007 injects a new component into the processing stream as the result of processing a received component, the new component is passed to the ACF by the mediation element so that it either precedes or follows the received component through subsequent processing in the mediation element sequence. This feature of embodiments of the ACF and mediation elements ensures that the SMP maintains a well-ordered and deterministic component sequence.

VI. Mediation elements that monitor, but do not alter received components, are configured by the SMP in two classes. The first class 1003, processes the received components before their alteration by any of the elements in the altering class 1004. The second class of monitoring elements 1005, processes components after any alterations made by their (possible) alteration. Monitoring mediation elements will find utility in generating operational measurements and usage/billing measurements, for example. These functions may be more conveniently addressed in downstream processes outside of these managed by the SMP itself.

VII. In addition to sequencing information, each mediation element has an initial activation status. The activation status of a mediation element determines whether or not the element actually receives components (active) or is bypassed by the ACF (inactive) during component processing. The activation status of a mediation element may change during mediation of a given association by the means described in subsequent paragraphs.

VIII. Upon completion of this configuration, the new mediation sub-system is ready for activation by the SMP operator. The operator may first verify sub-system operation by injecting test messages into the sub-system and observing its operation through SMP management functions. After activation, the sub-system exists as a class description of potential mediation instances within the SMP.

IX. The SMP will create individual instances of this new mediation class on receipt of messages (e.g. a TCAP Query or ISUP IAM) that initiate a new association to be monitored. It is the individual class instance that stores the local data (e.g. transaction identifiers, addresses) needed to mediate the association. Upon creation, each mediation element in the class instance assumes the initial activation status specified in step VIII above.

X. After creation, the mediation class instance monitors and mediates all components of the initial message. During this processing, individual mediation elements may change their activation status from 'active' to 'inactive' so that they do not process subsequent components of the association. Also, an active mediation element may alter the state of an inactive element to active so that the latter mediation element will receive subsequent components.

XI. After processing the initial message, the mediation class instance will await further messages pertaining to the association and process them until release of the association (e.g. Response to or Abort of a TCAP transaction). Once the final message has been processed, the protocol part, recognising the (protocol specific) association end, signals the SMP to delete the mediation class instance.

In addition to initial configuration of a mediation sub-system, the SMP operator may modify existing subsystems by adding or subtracting mediation elements or altering the sequencing of class elements. Similarly, the SMP operator may add new mediation elements to the SMP, thus making them available for use in new or existing SMP sub-systems.

The procedure for mediating a received component has been described as a sequential process in which the component first passes the initial monitoring mediation elements, then through the sequence of altering mediation elements, and finally through post-alteration monitoring mediation elements. A preferred embodiment of the invention may implement certain refinements to this basic sequential processing in order to improve performance and level processing loads within the SMP.

Upon receipt of a component for mediation, the ACF may make a copy of the received component and pass this copy to the pre-alteration monitoring meditation elements 1003. Since pre-alteration monitoring is independent of any component alteration, these monitoring functions may be scheduled to operate on the copy at a future time when the SMP is less busy. At the same time, the received component can be routed on to the altering mediation elements so that its processing is not delayed by the monitoring functions.

Upon completion of any altering mediation element processing, the ACF can make another copy of the (possibly altered) component. This copy can be retained and processed by the post-alteration monitoring mediation functions 1005 at a later time while the ACF routes the mediated component to the protocol part for transmission. This allows transmission of the mediated component after the shortest possible delay in the SMP and so contributes to overall efficiency of the mediation processing.

Scheduling of pre- and post-alteration mediation functions for times when the SMP is more lightly loaded also improves the efficiency of operation of the SMP by smoothing use of its processing resources at the cost of the additional storage required for the copied components.

It should be noted that although the above-described procedure is used in conjunction with SS7 signalling protocols, it may be modified to operate with equivalent network protocols, wherein destinations are identified by the address of network elements and sub-addresses of applications within each element.

Variations of the particular embodiment herewith described will be obvious to one skilled in the art, and accordingly the embodiment is to be taken as illustrative rather than limitive, the true scope of the invention being set out in the appended claims.

We claim:

1. In interconnected switched telecommunications networks, each comprising a number of network elements, each network element being interconnected via a plurality of communications channels whose connectivity and call processing operations are directly or indirectly controlled by signalling messages exchanged over a coupled but separate signalling network comprising a number of Signalling Points (SP) and a plurality of signalling links, a method of providing mediated access at a Signalling Mediation Point (SMP) for signalling messages exchanged between one signalling network and an interconnected other network so that communication between an originating SP in one network and a destination SP in the other network is mediated, comprising the steps of:

a) receiving a signalling message from said originating SP at said Signalling Mediation Point (SMP);
   b) determining at said SMP the type of message being forwarded by said originating SP;
   c) validating said received signalling message before allowing communication between said originating and terminating SPs;
   d) modifying data parameters in said received signalling message identifying the message's source and destination and modifying any invalid parameter values fond in the said received signalling message and recording information about or contained within said received signaling message; and
   e) routing said received signalling message with said modified data parameters to the said destination SP.

2. A method as claimed in claim 1, further comprising routing a received signalling message through a series of individual signal mediation functional elements, wherein each such mediation functional element performs a particular step in the validation and mediation of said received signalling message and any modifications that may be required in said received signalling message as a result of detecting invalid data parameters.

3. A method as claimed in claim 1, wherein said step of validating comprises at least one of either introducing, removing or modifying (altering) said individual signal mediation functional elements.

4. A method as claimed in claim 3, wherein each of said signal mediation functional elements perform any one of the following functions:

a) operate on said received signalling message to record information about the message or information contained in the message without altering the message;
   b) validate and mediate said signalling messages to ensure that they conform to the requirements of the intended communication between originating and destination SP's by performing comparisons between allowed data parameters and data value ranges and those observed in actual communication and determining whether to either allow communication to continue, or to alter or reject the non-compliant communication dialogue; or
   c) record information about or contained in the received signalling message following modification at step b) without making alteration of the message.

5. A method as claimed in claim 4, wherein validation and mediation of received signalling messages further comprises:

i) ensuring that data parameters contained in the message are allowed:
   ii) ensuring that data values within the allowed parameters fall within acceptable sets or ranges of values; and
   iii) ensuring that all data parameters and values required by the communication are in fact present in the message.

6. A method as claimed in claim 5, wherein a non-compliant communication dialogue is altered by:

i) removing invalid data parameters;
   ii) altering data values so that they fall within permitted ranges or value sets; and
   iii) inserting data parameters absent from the received signalling message.

7. A method as claimed in claim 1, wherein said step of modifying data parameters in said signalling message comprises determining a new signalling label at said SMP in order to route said signalling message to said destination SP located in said other network and said signalling label data parameters comprise an Originating Point Code ("OPC") and a Destination Point Code ("DPC") uniquely identifying the message's originating SP and the SMP respectively and wherein the determination of a new signalling label comprises defining a signalling relational map which identifies and controls the permissible signalling relationships between said originating SP in said one network and a destination SP in said other network.

8. A method as claimed in claim 7, wherein said signalling relational map defines a relationship between said originating and destination SPs and a Virtual Signalling Point ("VSP") located within said SMP.

9. A method as claimed in claims 8, wherein said signalling relational map is maintained at said SMP such that the OPC and DPC in the signalling label of a signalling message from said originating SP and directed to said VSP are altered to route the signalling message to said destination SP after the signalling message has been mediated at said SMP.

10. A method as claimed in claim 1, wherein if said signalling network supports a Signalling System Number 7 ("SS7") compliant Transaction Capabilities Application Part ("TCAP") user part, then said steps of mediating comprises:

a) receiving incoming signalling messages at a Transaction Monitor (TM) process from a Signalling Connection Control Part ("SCCP") user part;

b) decoding and validating said received signalling messages for syntactic correctness;

c) routing said signalling messages to a particular Transaction State Machine (TSM) process for handling a transaction identified by said signalling messages;

d) generating transaction identifiers for said messages and associating a transaction occurring between said originating SP and said SMP with a transaction occurring between said SMP and said destination SP; and e) using information recorded for the associated transactions to modify data parameters of said signalling message's signalling label so that the message received by the SMP can be routed to said destination SP.

11. A method as claimed in claim 10, further comprising the step of generating an abort message if any one of said received signalling messages is determined to have incorrect syntax or an unassigned transaction identifier.

12. A method as claimed in claim 8, wherein said SCCP messages are routed to an SCCP user sub-system by:

a) delivering signalling messages from said MTP user part to said SMP using the SMP's OPC;

b) receiving said signalling messages at said SCCP from said MTP; and c) routing to a selected sub-system according to the SCCP's Called Party Address ("CdPA").

13. A method as claimed in claim 8, wherein separate ISUP messages are associated at said SMP by monitoring the type and arrival sequence of signalling messages.

14. A method as claimed in claim 13, wherein said ISUP messages are associated by:

a) determining addressing information contained in a received ISUP message; and b) determining a corresponding destination address from said signalling relational map according to said addressing information.

15. A method as claimed in claim 14, wherein said addressing information comprises an Originating Point Code (OPC), Destination Point Code (DPC) and a Circuit Identification Code (CIC).

16. A method as claimed in claim 15, wherein a corresponding destination address is determined by reading a call record related to said ISUP message in a call map located at said SMP using said addressing information.

* * * * *